United States Patent
Ko et al.

(10) Patent No.: US 10,417,210 B2
(45) Date of Patent: Sep. 17, 2019

(54) MULTI-TOKEN MATCHING SCHEME

(71) Applicant: salesforce.com, inc., San Francisco, CA (US)

(72) Inventors: Kenneth Chung Kay Ko, San Francisco, CA (US); Kanagha Pradha Kumar Prasad, San Bruno, CA (US); Rupali Jagtap, Fremont, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 318 days.

(21) Appl. No.: 15/332,879

(22) Filed: Oct. 24, 2016

(65) Prior Publication Data
US 2018/0060319 A1 Mar. 1, 2018

Related U.S. Application Data

(63) Continuation-in-part of application No. 15/251,334, filed on Aug. 30, 2016.

(51) Int. Cl.
G06F 17/30 (2006.01)
G06F 16/22 (2019.01)
G06F 16/31 (2019.01)

(52) U.S. Cl.
CPC ........ *G06F 16/2255* (2019.01); *G06F 16/313* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

"Google Plus Users", Google+Ripples; Oct. 31, 2011; 3 pages.

(Continued)

*Primary Examiner* — Alex Gofman
(74) *Attorney, Agent, or Firm* — Schwabe Williamson & Wyatt

(57) ABSTRACT

A multi-token matching scheme efficiently detects multi-token keyword matches in content received by a database system. A keyword list may include multi-token keywords. Head tokens from the multi-token keywords are converted into a head hashmap. Token chains identifying tokens and delimiters in the multi-token keywords are generated and linked to the head hashmap. Tokens in the content are compared with the head hashmap. The matching tokens and following segments in the content are compared with the token chains. Portions of the content matching the token chains are identified as keyword matches. The matching scheme may use reverse delimiter tries to detect content matches for multi-token keywords with leading delimiters.

20 Claims, 18 Drawing Sheets

(56) References Cited

U.S. PATENT DOCUMENTS

| | | | |
|---|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,411,952 B1 * | 6/2002 | Bharat .............. G06F 17/30864 |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B2 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | | |
|---|---|---|---|
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0145900 A1* | 6/2010 | Zheng | G06N 7/005 |
| | | | 706/52 |
| 2011/0208822 A1 | 8/2011 | Rathod | |
| 2011/0218958 A1 | 9/2011 | Warshaysky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0018906 A1* | 1/2013 | Nigam | G06F 17/30985 |
| | | | 707/758 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0026181 A1 | 1/2014 | Kiang | |
| 2014/0278367 A1* | 9/2014 | Markman | G06F 17/2765 |
| | | | 704/9 |
| 2014/0359537 A1 | 12/2014 | Jackobson et al. | |
| 2017/0124472 A1 | 5/2017 | Fu | |
| 2018/0013764 A1 | 1/2018 | Morrison | |
| 2018/0060363 A1 | 3/2018 | Ko et al. | |
| 2018/0063192 A1 | 3/2018 | McGuire et al. | |

OTHER PUBLICATIONS

Rolling Time Window Counters with Redis and Mitigating Botnet-Driven Login Attacks, Open Source Hacker, Jul. 9, 2014, pp. 1-7.

\* cited by examiner

MULTI-TOKEN MATCHING SCHEME

CROSS-REFERENCES TO RELATED APPLICATIONS

This application is a continuation-in-part application of U.S. patent application Ser. No. 15/251,334, filed Aug. 30, 2016, which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, hut otherwise reserves all copyright rights whatsoever.

TECHNICAL FIELD

The technology relates to moderating content in a database system.

BACKGROUND

Different networks may operate within a database system. The networks are alternatively referred to as communities and may provide customized database presentations for a group of users. These database communities may wall off different content to different user groups. For example, a community may be operated by a company and may include internal company employees and external company customers. The external customers may have access to some content posted in the community but may not be able to view other content posted by internal employees.

Security systems may filter content posted by users. For example, the security systems may filter inappropriate words or may block certain users who post spam. However, these security systems are not readily extensible to different database communities. As mentioned above, each community may have different types of users that may need different levels and types of content moderation. Different communities also may want to filter different types of content for different groups of users, and perform different types of content moderation when these different types of content are detected. Due to the variety of different moderation configurations, each community may need custom security software.

The security system may include lists of offensive or inappropriate words for comparing with content posted by the users. The security system may compare each word in the list with content posted by the users. The security system may take longer to filter content as the list of offensive words gets larger and the amount of content increases.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
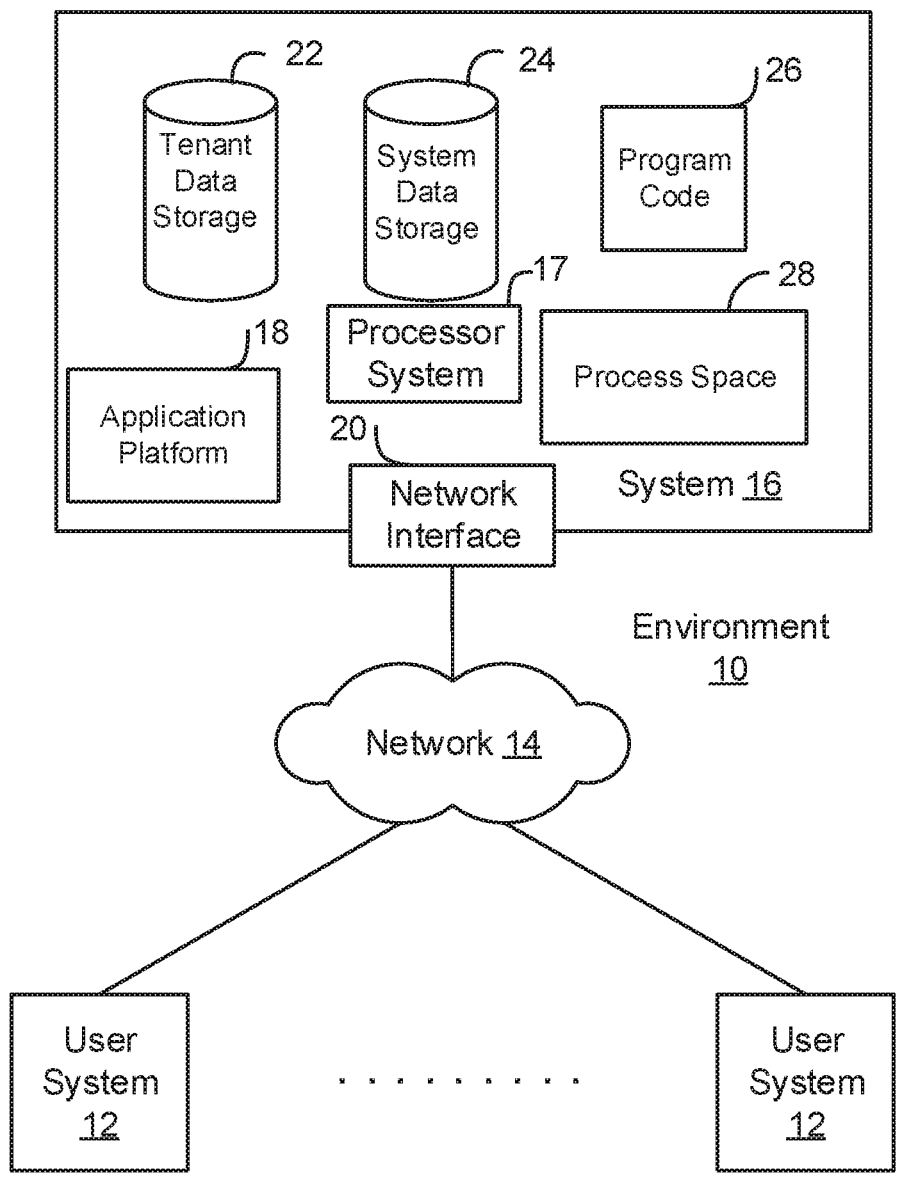
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as teed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
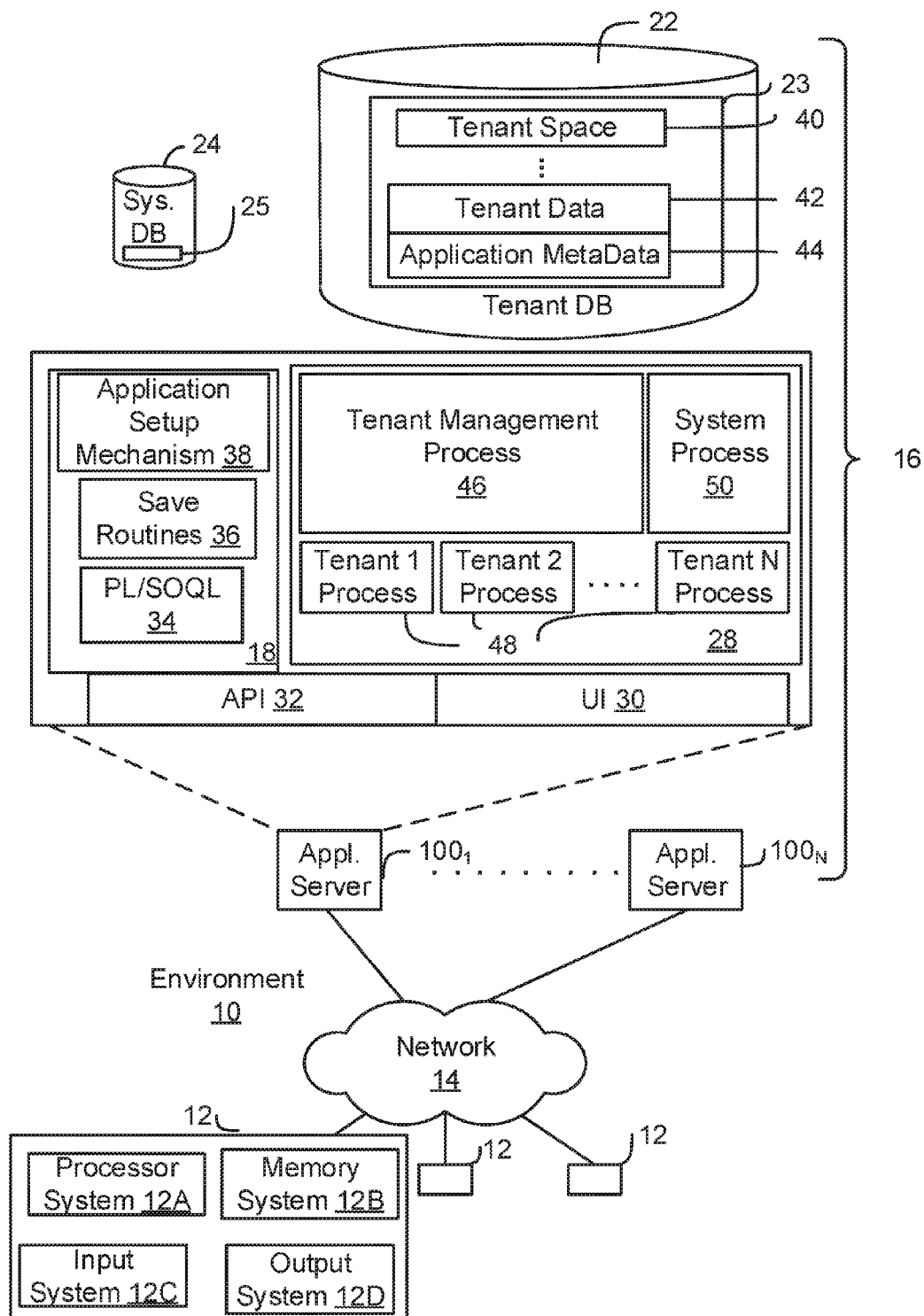
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed, above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data, structures managed by system 16 that are allocated at the tenant level while other data structures can be managed at the user level. Because an MIS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Extensible Moderation Framework

A moderation framework monitors content posted in a database network and uses a declarative configuration scheme to define moderation rules without having to write new software. The moderation framework may perform a variety of selectable actions when different types of users and/or keywords are detected. For example, the moderation framework may replace or remove a word prior to posting the content in the database network. In another example, the moderation framework may tag the content for review prior to exposing it to non-moderators in the database network, an action alternately referred to as premoderation.

A user interface operated by the moderation framework allows selection of different user criteria and different content criteria for triggering the moderation rules. The user interface also provides selectable actions for the moderation rules to apply when the content matches the selected user and content criteria. The user interface also allows selection of different entities for associating with different moderation rules, such as accounts, cases, opportunities, Chatter® feed posts, or custom objects defined by customers.

Figure 2:
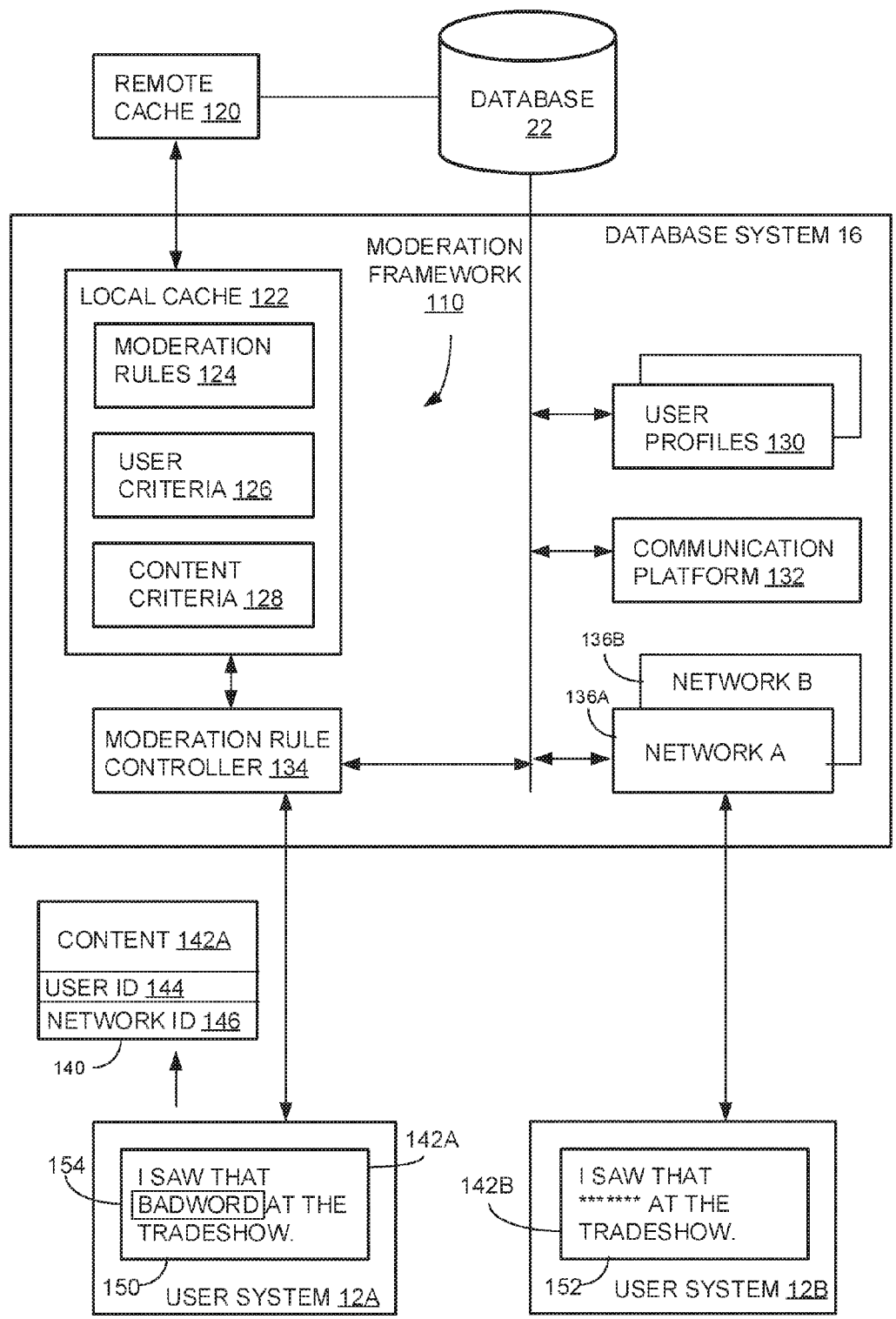
FIG. 2 shows an example extensible content moderation framework.

FIG. 2 shows one example moderation framework 110 that moderates content posted in database networks 136. Database networks 136 may operate within database system 16 and may be associated with any community or configurable group of users. In one example, users affiliated with networks 136 may be associated with particular companies or particular organizations within a company. Different types or groups of users may be associated with a same network 136. For example, one of networks 136 may include both internal users/employees of a company and external users/customers of the company.

Networks 136 are alternatively referred to as communities and may have customized skins, electronic page colors, page layouts, etc. The communities also may wall off different content to different user groups. For example, certain employees may not be able to view certain content posted by partners and certain customers may not be able to view certain content posted by employees.

One example partnership network community 136 may include a group of contractors that access cases. A community of customers may file the cases and the contactors in partnership community 136 may work on the cases. The partnership and customer communities may have a same shared base of data. However, the customers in the customer community may not be able to view contractor conversations inside partnership community 136.

Database system 16 may define community members with user profiles and permission sets 130. Each user's profile 130 within database system 16 provides different access privileges both for accessing particular networks 136 and for accessing different content and performing different operations within networks 136. User profiles 130 also may associate users with different user categories or groups. For example, user profiles 130 may identify users as managers, engineers, salesman, customers, external users, new employees, for networks 136.

Users may use a communication platform 132, such as Chatter®, to post content in networks 136. Different users may view or post content via communication platform 132 based on associated user settings and/or permissions in user profiles 130. For example, company employees identified by user profiles 130 may view internal posts from other employees and also view external posts from external customers. External customers identified by user profiles 130 might only view content posted by other customers or posted by employees specifically for external customer viewing.

Some networks 136 may only be privately accessible by users associated with a particular organization. Other networks 136 may be publically accessible social media networks, such as Facebook®, Twitter®, Instagram®, etc. User profiles 130, communication platform 132, and networks 136 are known to those skilled in the art and are therefore not described in further detail.

Moderation framework 110 includes a moderation rule controller (rule controller) 134 that monitors content 142 posted by different users on networks 136. Moderation framework 110 also includes extensible moderation rules 124, user criteria 126, and content criteria 128 that rule controller 134 uses for moderating content 142.

For example, a user operating user system 12A may be a member of network 136A. The user may enter content 142A into a user interface 150 and then send a request 140 to post content 142A in network 136A. Request 140 may include a user identifier 144 identifying the user sending request 140 and a network identifier 146 identifying which network 136A to post content 142A.

Content 142A may contain one or more word or phrases 154 that one or more moderation rules 124 are configured to filter. For example, phrase 154 may include profanity or any other type of inappropriate or offensive language. In another example, phrase 154 may include spam that one of moderation rules 124 are configured to block. In yet another example, phrase 154 may include a name of a competitor that one of moderation rules 124 are configured to tag for analytic purposes.

Phrase 154 is alternatively referred to as a badword and may include any combination of alpha-numeric characters, non-alpha. numeric characters, and/or other delimiters. Content 142A may include text, links, files, private messages, records, objects, or any other data capable of being sent to database system 16.

In response to receiving request 140, rule controller 134 may load moderation rules 124 associated with network 136A. For example, rule controller 134 may load moderation rules 124 from database 22 into remote cache 120. Remote cache 120 is an intermediate, distributed cache layer that lives on servers between the main server and database 22. Rule controller 134 also may load user criteria 126 and content criteria 128 associated with the moderation rules 124.

Rule controller 134 applies moderation rules 124 to content 142A based on the user criteria 126 and content criteria 128. User criteria 126 may specify particular types of users for applying moderation rules 124. For example, user criteria 126 may identify external users that are not employees of the company affiliated with network 136A. User criteria 126 may also identify internal users who have recently joined the company.

Rule controller 134 may determine the types of users sending content 142A based on user id 144. For example, controller 134 may identify one of user profiles 130 associated with user id 144. The identified user profile 130 may identify the user as an external user.

Rule controller 134 may check content criteria 128 when the user sending content 142A satisfies user criteria 126. Otherwise, controller 134 may disregard that particular moderation rule 124. Content criteria 128 may include one or more lists of keywords for comparing with content 142A. For example, content criteria 128 may include a. list of derogatory, offensive, or profane words.

Rule controller 128 determines if content 142A includes any of the keywords in content criteria 128. If so, rule controller 134 performs an associated action identified in moderation rule 124. For example, the action may direct rule controller 134 to replace the matching phrase in content 142A with asterisks. Controller 134 replaces the phrase in content 142A and then posts the moderated content 142B in network 136A.

Moderation framework 110 may moderate content 142 posted on selectable networks 136 based on selectable moderation rules 124, selectable user criteria 126, and/or selectable content criteria 128. The extensible and selectable moderation rules 124 and rule criteria 126 and 128 simplify the creation and management of content moderation for database networks 136.

Figure 3:
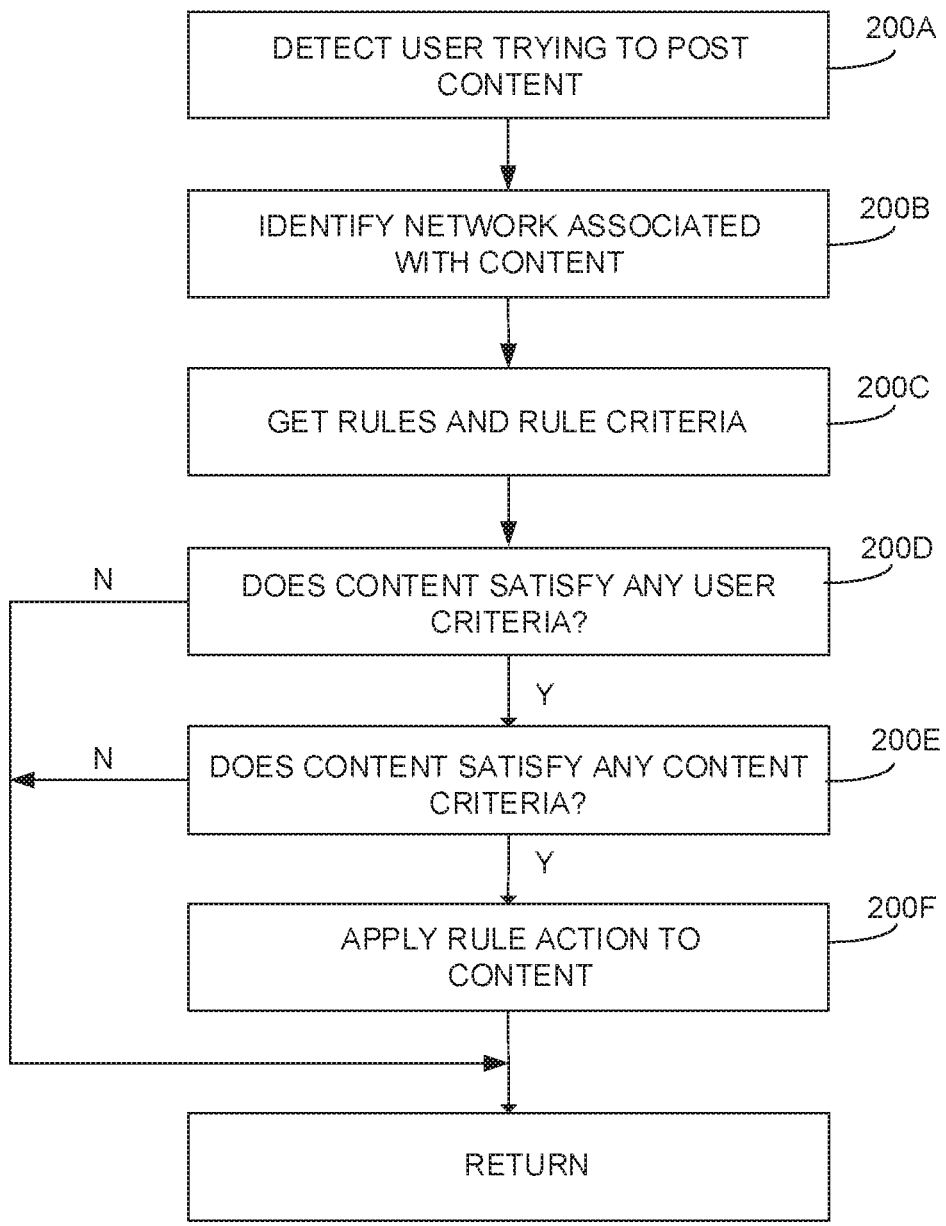
FIG. 3 shows an example process performed by the content moderation framework.

FIG. 3 shows one example moderation framework process. Referring to FIGS. 2 and 3, operation 200A detects a user trying to post content 142A and operation 200B identifies the network 136 associated with content 142A. For example, user request 140 may include a network identifier 146 for network 136A.

Operation 200C may load the rules and rule criteria for the identified network. For example, rule controller 134 may load rules 124 and rule criteria 126 and 128 associated with network identifier 146.

Operation 200D determines if the user posting content 142A satisfies any of the loaded user criteria 126. For example, rule controller 134 may determine if any profiles 130 or permissions associated with user id 144 indicate the user belongs to any of the user categories identified in user criteria 126. Rule controller 134 may post content 142A to network 136A without any further moderation when the user does not satisfy any of the user criteria 126.

When user criteria 126 does apply, operation 200E may check content criteria 128. For example, rule controller 134 may determine if any keywords in content criteria 128 match any phrases in content 142A. If not, the moderation rule 124 does not apply and rule controller 134 posts content 142A to network 136A with no moderation.

If there are keyword matches, operation 200F applies the action for the associated rule 124 to content 142A. For example, rule 124 may include a premoderation action that sends content 142A to a designated network moderator. The network moderator may review and/or edit content 142A prior to posting in network 136A.

Figure 4:
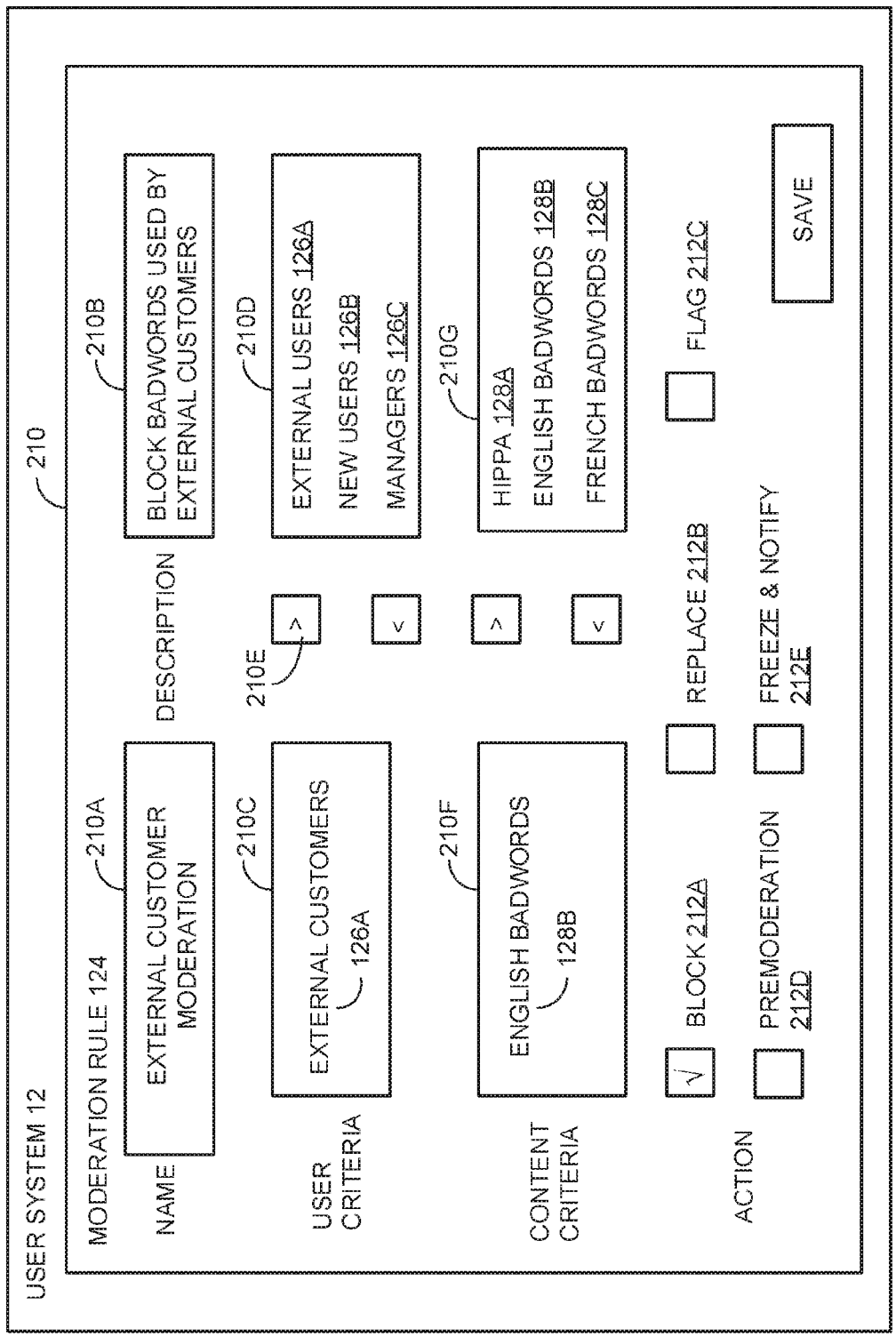
FIG. 4 shows an example moderation rule template.

FIG. 4 shows an example rule template operated by the moderation framework for creating or editing moderation rules. Rule template 210 may include a name field 210A and a description field 210B for assigning a name and description, respectively, to moderation rule 124.

For example, the network administrator may enter the name external customer moderation to identify a moderation rule 124 that moderates content posted by external users. As mentioned above, an external user may have some access to a network/community but may not be directly affiliated or employed by the organization that operates the network/community. For example, external users may be customers of the business that operates the network.

The network administrator may select between different user criteria lists 126 that identify different users or user categories. The network administrator may use different arrow icons 210E to scroll and select different user criteria lists 126 displayed in field 210E for associating with moderation rule 124. Selected user criteria list 126A is displayed in field 210C.

User criteria lists 126 may include user identifiers (user ids) for specific users or may include profile identifiers for different user groups, user categories, or user permission levels. A first external user criteria list 126A may include profile identifiers for external customers and a second new users criteria list 126B may include profile identifiers for users that have only been members of the network for some limited period of time. A managers criteria list 126C may include profile identifiers associated with network managers. Again, the rule controller may identify external customers, new users, managers, etc. by using user id 144 in FIG. 2 to identify the different user categories or permission levels in associated user profiles 130.

Another type of user criteria list 126 may identify users that have not posted content for some designated period of time. For example, to moderate surprise content attacks, a system administrator may create a rule 124 that provides more cautious moderation of content from users that have not posted content for some relatively long period of time.

The system administrator may select a user criteria list 210 for users who infrequently post content. Based on the selected user criteria list, the rule controller may check user profiles 130 in FIG. 2 and identify the last time the user posted content in the database system. If the user has not posted content for a specified period of time, the rule controller may trigger moderation rule 124.

The network administrator also may select one or more content criteria lists 128 displayed in field 210G to associate with moderation rule 124. The network administrator may create different content criteria lists 128 that contain different keywords. For example, a first one of content criteria lists 128A may include keywords designated as inappropriate under the health insurance portability and accountability act (HIPPA). A second one of content criteria lists 128B may include bad or offensive English words. A third one of content criteria lists 128C may include bad or offensive French words.

Content criteria lists 128 may include any combination of keywords for triggering moderation rule 124. For example, one of content criteria lists 128 may include competitor names. The associated moderation rule 124 may flag any content that includes any of the competitor names for review by a particular group of users, moderators, managers, and/or marketers that monitor competitor related content.

The system administrator may select different actions 212 that moderation rule 124 takes in response to detecting selected user criteria 126A and selected content criteria 128B. Example actions 212 may include, but are not limited to, block, replace, flag, premoderation, and freeze & notify.

Block action 212A may prevent any content that includes one of the keywords in content criteria 128B from posting on the network. Replace action 212B may let the content post but replace the matching phrases in the content with other words or characters, such as asterisks.

Flag action 212C may flag the content that includes matching phrases. Moderation rules 124 may use different flags for different types of content, such different flags identifying spam, inappropriate words, and competitor names.

Premoderation action 212D may send the content to a system administrator/moderator for review prior to exposing it to non-moderators in the network. After moderator approval, other users in the community may view the content. Freeze & notify action 212E may lock the user out of the network and notify the moderator.

Different moderation rules 124 may be created for different actions 212. For example, a first moderation rule 124 may replace content and a second moderation rule 124 may flag the content to notify the network moderator. The rules may use the same or different combinations of user criteria 126 and content criteria 128. Reusing different combinations of user criteria 126 and content criteria 128 for different moderation rules 124 increases extensibility by not having to define new criteria for each rule.

As mentioned above, moderation rules 124 are typically triggered off a combination of selected user criteria 126A and selected content criteria 128B. When no user criteria 126 is selected, moderation rule 124 may trigger based only on selected content criteria 128B. Similarly, if no content criteria 128 is selected, moderation rule 124 may trigger based only off of selected user criteria 126A. The rule controller may apply a selected action 212 to all network content when moderation rule 124 includes no selected user criteria 126 and no selected content criteria 128.

As explained in more detail below, rule template 210 may include an entity field for selecting different entity criteria for triggering moderation rule 124. The entity field may allow the system administrator to select a category or type of content, such as a post, comment, file, private message, custom object, etc. Similar to user criteria 126 and content criteria 128, moderation rule 124 may not trigger unless the content includes the selected entity criteria.

Figure 5:
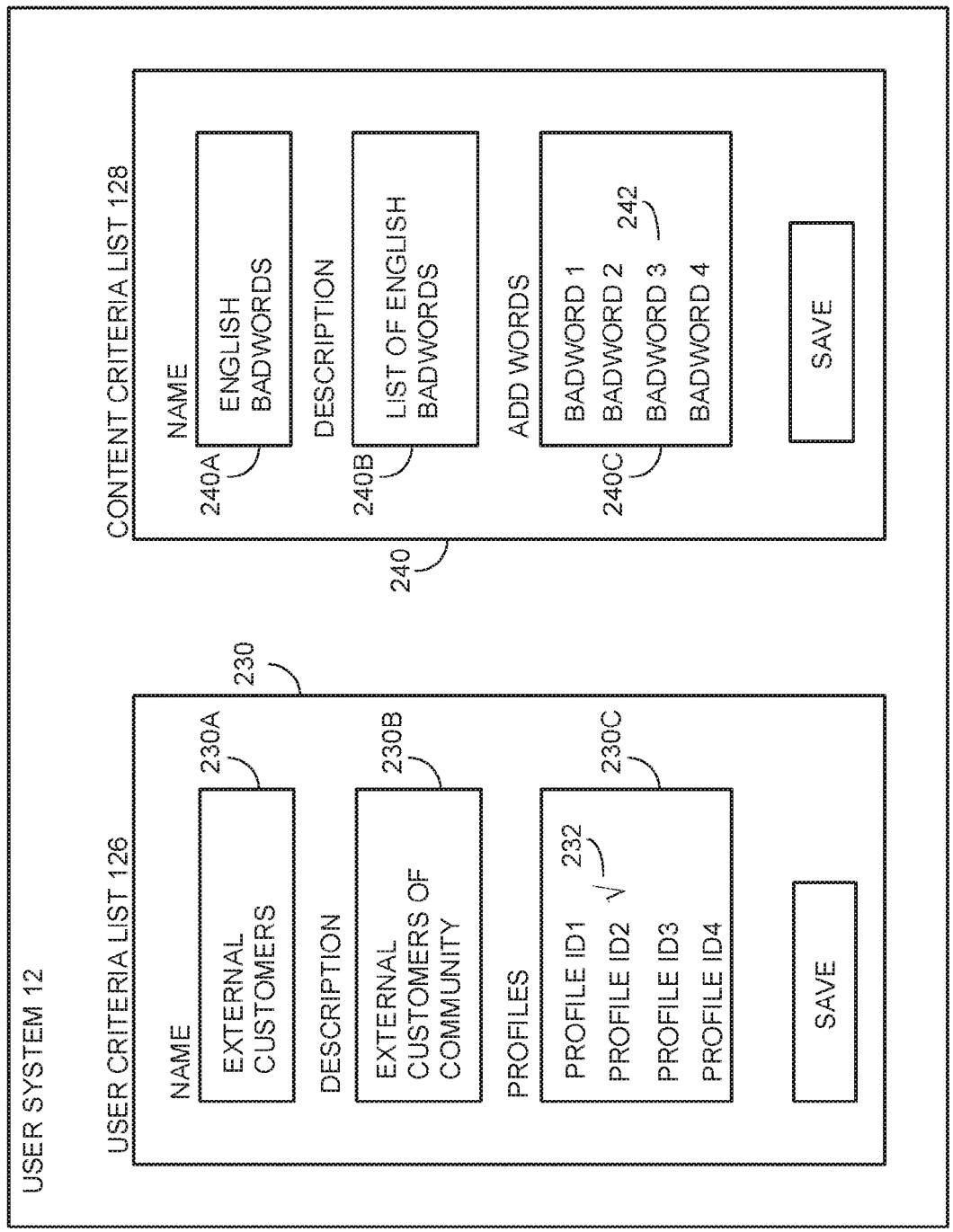
FIG. 5 shows example user and content criteria templates.

FIG. 5 shows example user criteria and content criteria templates. The moderation framework may display a user criteria template 230 for creating or editing user criteria lists 126 shown above in FIG. 4. The system administrator may enter a name for user criteria list 126 into field 230A and enter a description for user criteria list 126 into field 230B.

The system administrator may enter or select profile identifiers 230D, permissions, user identifiers, etc. displayed in field 230C for adding to user criteria list 126. As mentioned above, the database system may include different user and group profile identifiers 232 that identify types of users, user groups, or user categories. User criteria template 230 may automatically search and display different profile identifiers 232 stored in the database system associated with a particular database network. The system administrator may select any of the profile identifiers 232 in field 230C or may manually enter profile identifiers 232 into field 230C. The network administrator then saves the selected profiles identifiers 232 as part of user criteria list 126.

The moderation framework may display a content criteria template 240 for creating or editing content criteria lists 128 as shown above in FIG. 4. For example, the system administrator may enter a name into field 240A and enter a description into field 240B for content criteria list 128. The system administrator may enter keywords 242 into field 240C for adding to content criteria list 128. Keywords 242 may include any word, phrase, term, character, etc. The created and/or edited user criteria list 126 and content criteria list 128 are then displayed by moderation rule template 210 described above in FIG. 5.

The extensible moderation framework creates or edits moderation rules 124 simply by selecting user criteria lists 126, content criteria lists 128, and actions 212 displayed in moderation rule template 210. Selectable intuitive user interface 210 can add, change, and/or manage moderation rules 124 without writing new software code.

Figure 6:
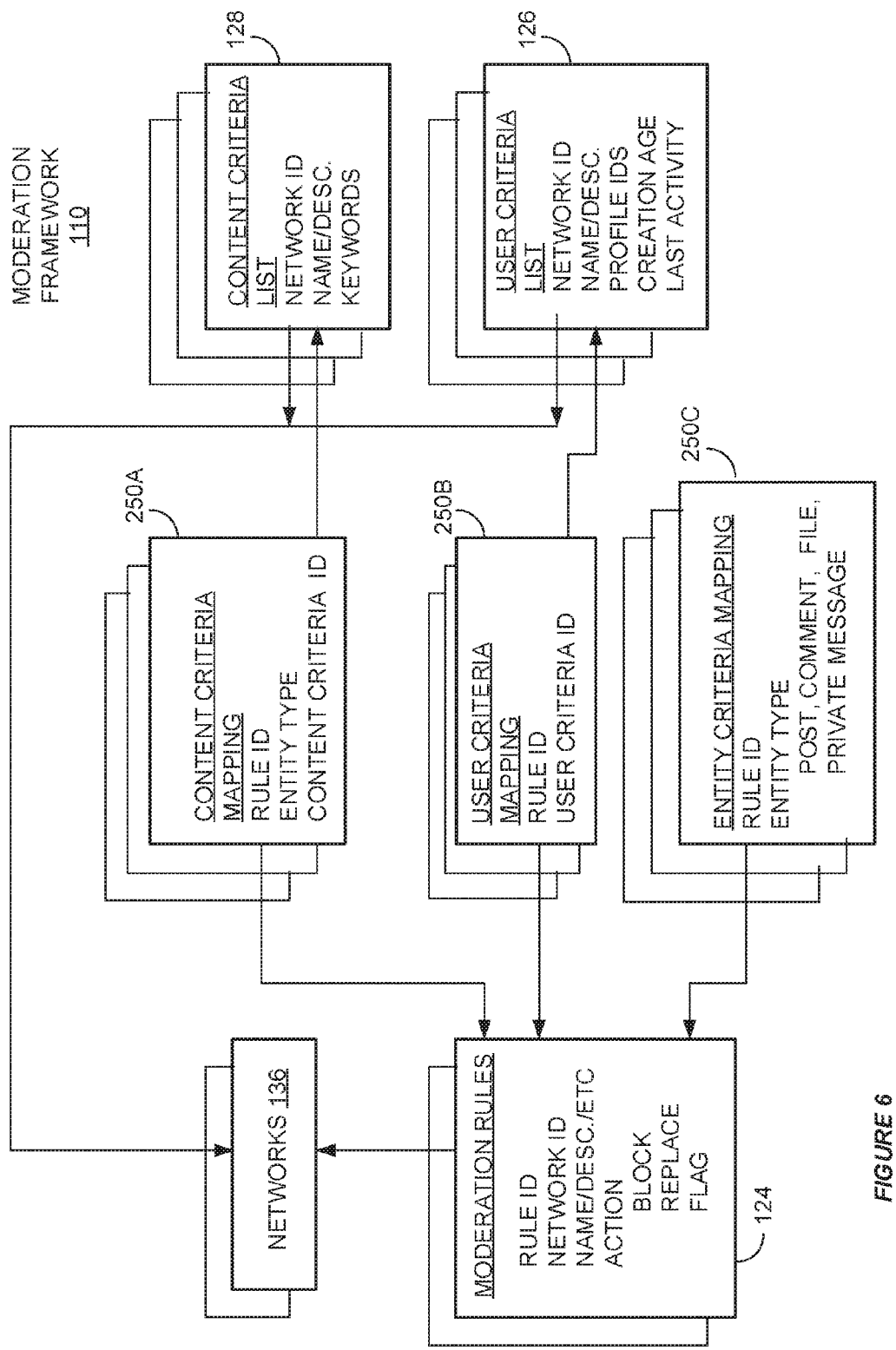
FIG. 6 shows an example data structure for the content moderation framework.

FIG. 6 shows an example data structure for the moderation framework. Moderation rule 124 may include a name, and description as described above and include at least one action, such as a block, replace, or flag operation. A network identifier may associate moderation rule 124 with one or more networks 136, communities, groups, etc.

Content criteria lists 128 may include a network identifier, name and description, and a list of keywords. The network identifier may link content criteria list 128 to a specific network 136. User criteria lists 126 may include a network identifier, name, and description. User criteria lists 126 also may include profile identifiers, creation age identifiers, and last activity identifiers.

As described above, the profile identifiers may identify different types of users that may trigger moderation rule 124. The creation age identifier may trigger moderation rule 124 based on how long the user has been a member of a network 136. For example, new users recently been added to network 136 may trigger certain moderation rules 124 that more closely regulate posted content.

The last activity identifier may trigger moderation rules 124 based on the last time the user accessed or posted content on network 136. The moderation platform may identify the creation age and last activity for the user from the user profiles maintained by database system 16.

Different mappings 250 link content criteria 126 and user criteria 128 to different moderation rules 124. For example, content criteria mapping 250A may include a rule identifier, entity type, and a content criteria identifier. The rule identifier in content criteria mapping 250A may link to one or more of moderation rules 124 and content criteria identifier in content criteria mapping 250A may link to one or more content criteria lists 128. The entity type in mapping 250A may identify a type of field or object for triggering the linked moderation rule 124. User criteria mapping 250B includes a rule identifier linking to one or more of moderation rules 124 and includes a user criteria identifier mapping to one or more user criteria lists 126.

Entity criteria mappings 250C may include rule identifiers linking to moderation rules 124 and include different entity types. As described above, the entity types may identify types of data or fields for triggering linked moderation rules 124. For example, entity types may identify a post, comment, file, private message, or any other type of selectable content or object entered into any selectable field, record, or any other data element.

Figure 7:
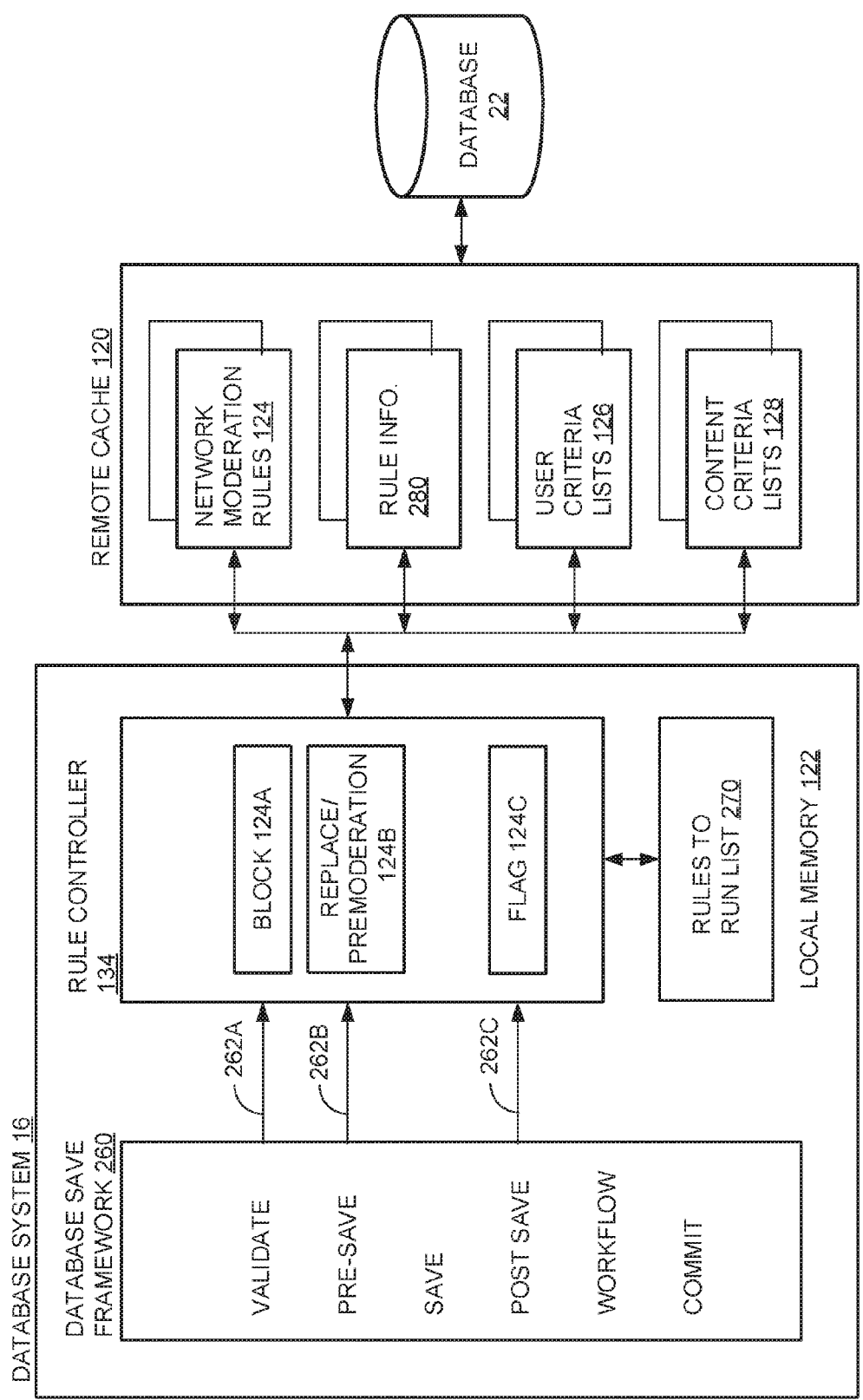
FIG. 7 shows an example triggering and storage scheme used by the content moderation framework.

FIG. 7 shows an example moderation framework for triggering and loading moderation rules 124. A database save framework 260 may generate triggers 262 when a user saves or inserts data in database system 16. For example, the save framework 260 may generate triggers 262 to invoke actions during the validation, presave, save, post save, workflow and commit phases of a save transaction in the database system 16. Save framework 260 is known to those skilled in the art and is not described in further detail.

Moderation rules 124 may trigger at different times. For example, validation operations in framework 260 validate the data values entered by users. Validation trigger 262A may trigger a block moderation rule 124A before database system 16 saves the content. A presave trigger 262B may trigger a replace or premoderation rule 124B before the content enters database system 16 for processing. A post save trigger 262C may trigger a flag moderation rule 124C since the content should be saved prior to flagging it in the database.

Figure 8:
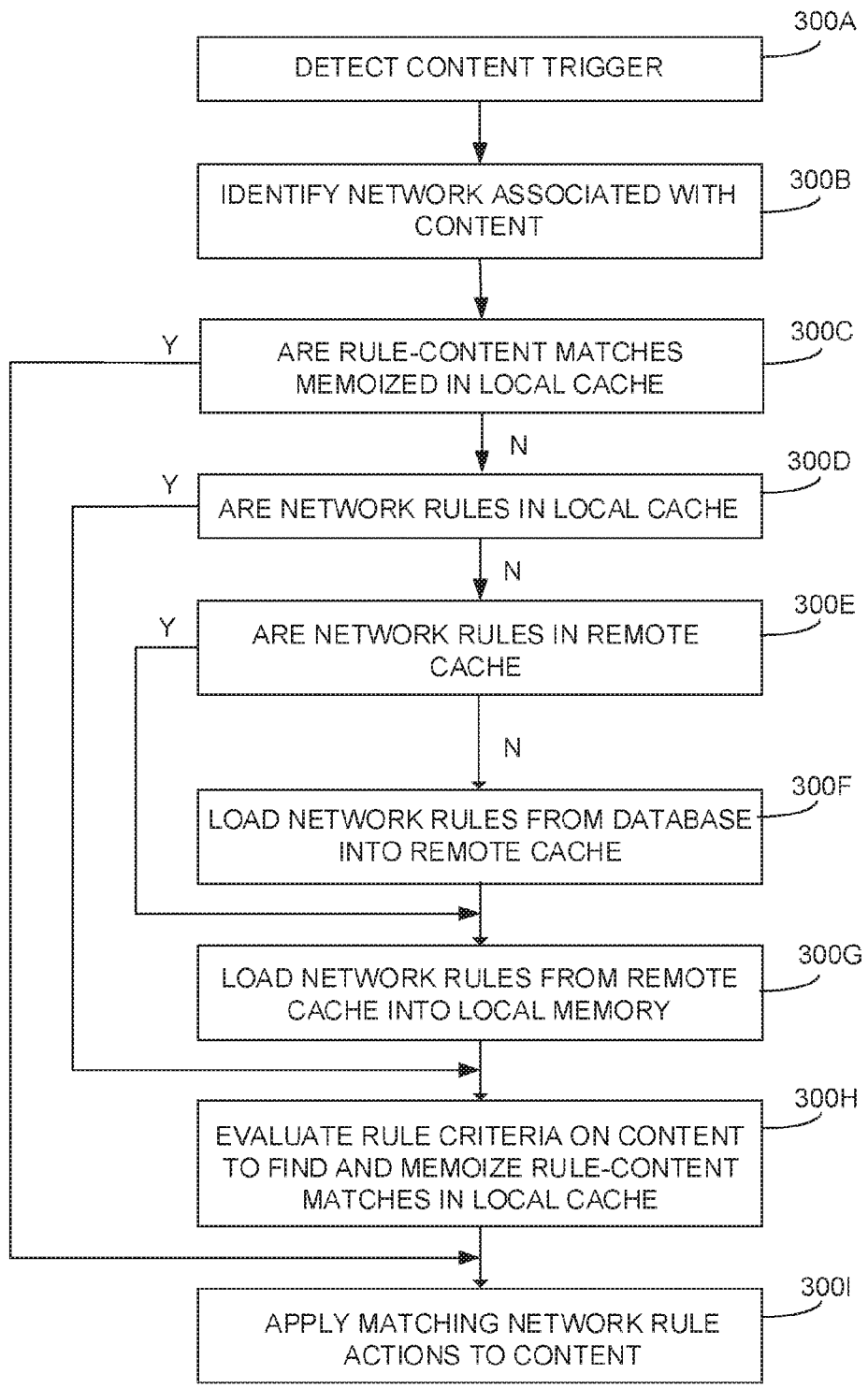
FIG. 8 shows an example process for loading and applying moderation rules and associated rule criteria.

FIG. 8 shows an example process for optimizing moderation rule execution. Referring to FIGS. 7 and 8, remote cache 120 and internal memory cache 122 may be any type of memory with relatively fast read and/or write speeds compared with database 22, such as random access memory (RAM) or Flash memory.

Operation 300A may detect a trigger 262 from save framework 260. For example, a user may send a request to the database system to post content in a particular network. Operation 300B identifies the network associated with the content based on the network identifier included with the user request.

Operation 300C may determine if moderation rules 124 for the identified network and content matches are memorized in local cache memory 122. If so, operation 300I may apply the matching network rule actions to the content in operation 300I. For example, rule controller 134 may perform a block, replace, pre-moderate, flag, or freeze & notify operation on the content associated with the matching rule.

Otherwise, operation 300D may determine if moderation rules 124 for the identified network are located in local cache memory 122. If so, operation 300H may evaluate the rule criteria for the content to find and memorize rule-content matches in the rules to run list 270 in local cache 122. Operation 300I then applies the matching network rule actions to the content. Rules with no matching content may be discarded.

Operation 300E may determine if network moderation rules 124 are located in remote cache 120. If so, operation 300G loads the network rules from remote cache 120 into local cache 122 before performing operations 300H and 300I. If not, operation 300F may load the network rules from database 22 into remote cache 120 before performing operations 300G, 300H, and 300I.

The rule controller may load all moderation rules 124, rule information 280, user criteria lists 126, and content criteria lists 128 associated with the identified network. Moderation rules, 124, user criteria lists 126, and content criteria lists 128 can be separately loaded into both remote cache 120 and local memory 122 and are relatively static. Therefore, rule controller 134 may keep previously applied moderation rules 124, associated user criteria lists 126, and associated content criteria lists 128 in local memory 122 for subsequent content moderation.

III. Multi-Token Matching

A multi-token matching scheme efficiently detects multi-token keyword matches in content received by a database system. A keyword list may include multi-token keywords. Head tokens from the multi-token keywords are converted into a head hashmap. Token chains identifying tokens and delimiters in the multi-token keywords are generated and linked to the head hashmap. Tokens in the content are compared with the head hashmap. The matching tokens and following segments in the content are compared with the token chains. Portions of the content matching the token chains are identified as keyword matches. The matching scheme may use reverse delimiter tries to detect content matches for multi-token keywords with leading delimiters.

Figure 9:
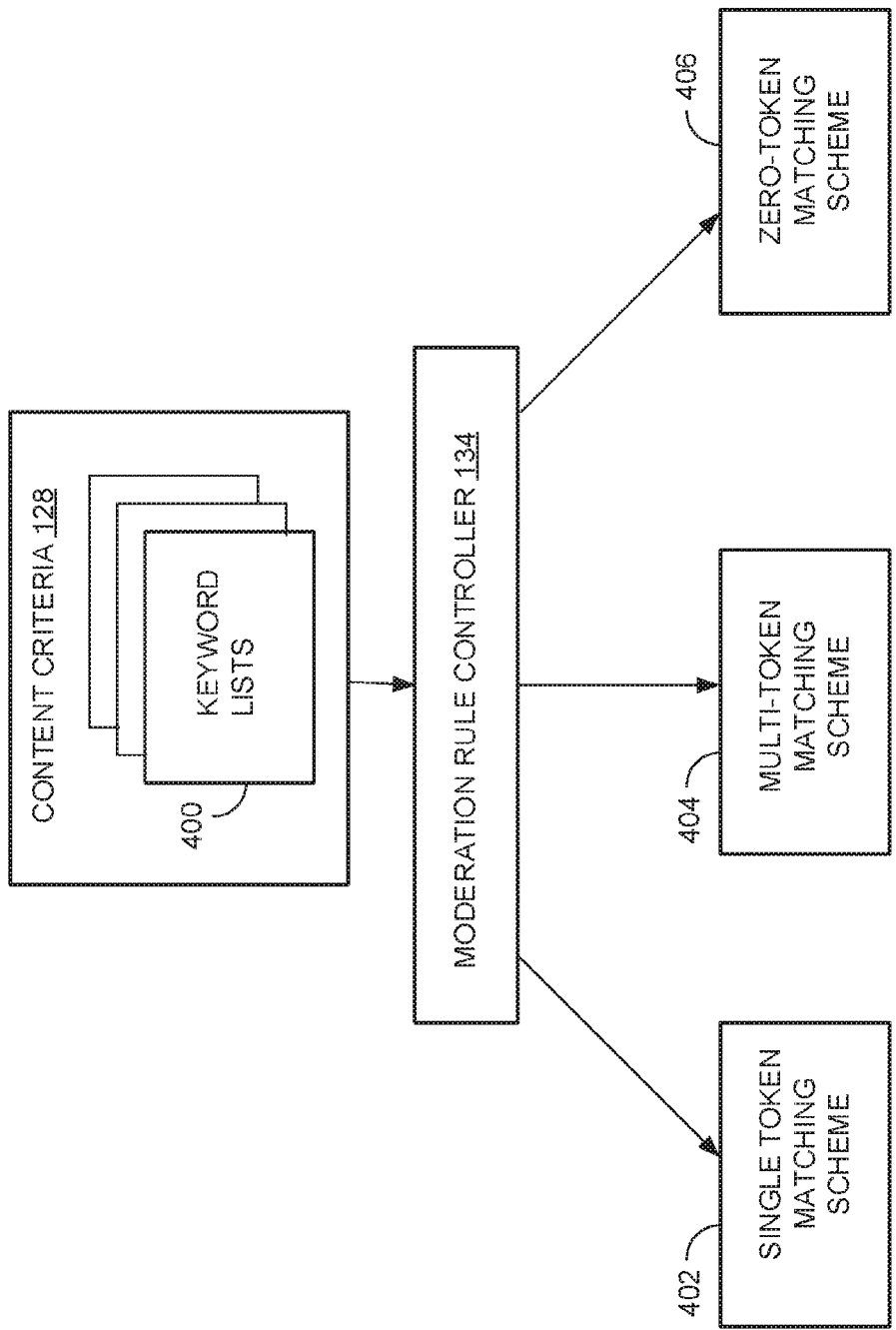
FIG. 9 shows an example multi-token matching scheme.

FIG. 9 shows an example multi-token matching scheme used by the moderation rule controller 134 to improve content moderation performance. As explained above, content criteria 128 may include one or more keyword lists 400, Different keyword lists 400 may correspond to different types of content moderation. For example, a first keyword list 400 may include offensive English words, a second keyword list 400 may include offensive French words, and a third keyword list 400 may include competitor names of interest to a particular network community.

Keywords in keyword lists 400 may include any combination of tokens and delimiters. Delimiters may include any sequence of one or more characters that specify a boundary between separate, independent regions of plain text or other data streams. The independent regions separated by the delimiters are generally referred to as tokens and may include any combination of alpha-numeric characters. Delimiters may include any combination of non-alphanumeric characters, spaces, punctuation, etc. For example, delimiters may include a comma, which acts as a field delimiter in a sequence of comma-separated values. Keywords that include more than one token or include a combination of tokens and delimiters are alternatively referred to as multi-token keywords.

Moderation rule controller 134 may use a single token hashing scheme 402. to identify matching single token keywords in keyword lists 400 and use a multi-token matching scheme 404 to identify matching multi-token keywords in keyword lists 400. Moderation rule controller 134 may use a zero-token matching scheme 406 to identify matching delimiter keywords in keyword lists 400.

Figure 10:
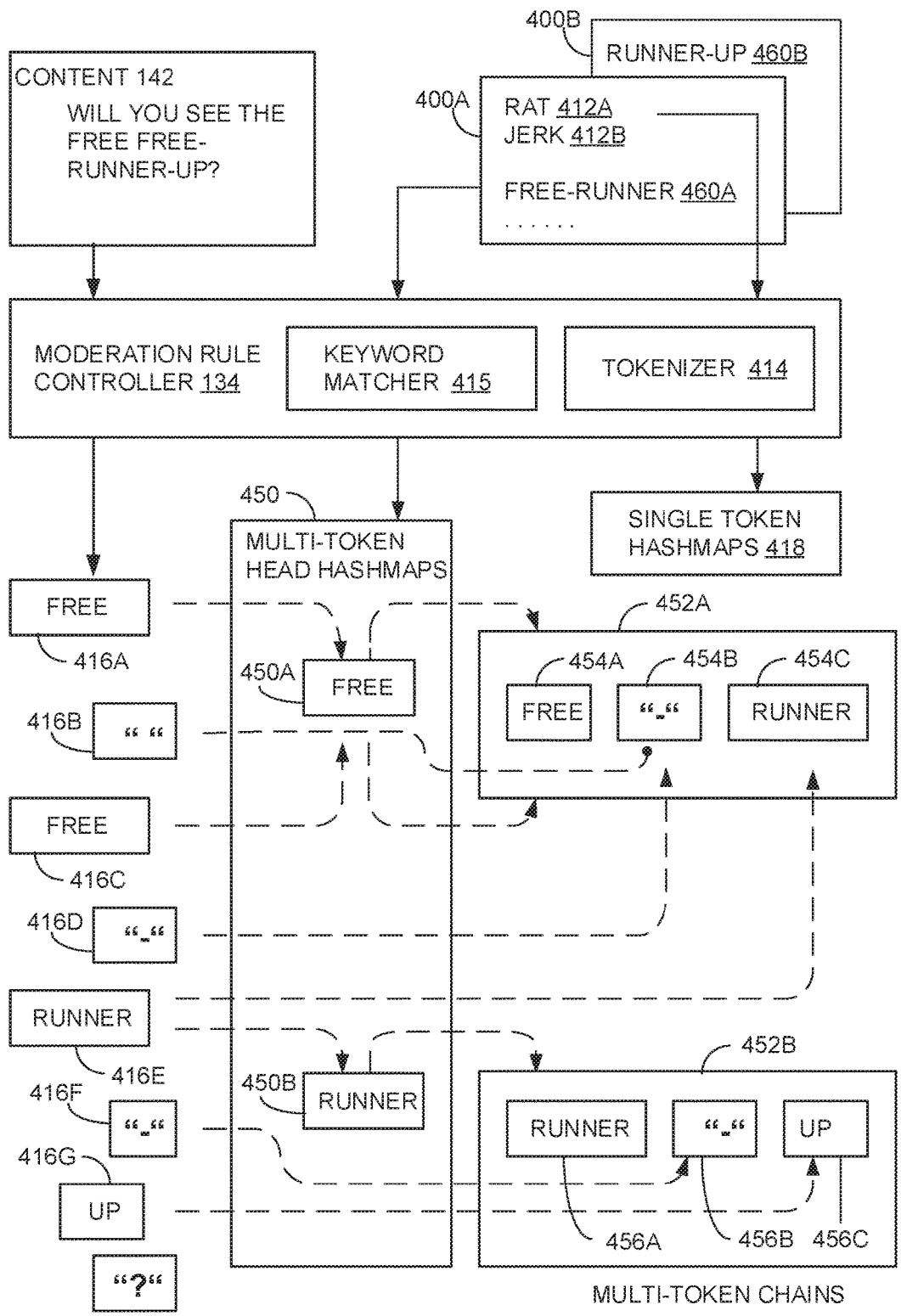
FIG. 10 shows the multi-token matching scheme in more detail.

FIG. 10 shows one example of the multi-token matching scheme used by moderation rule controller 134. One or more keyword lists 400 may include multi-token keywords 460. For example, in addition to including single token keywords 412A and 412B, keyword list 400A may include multi-token keyword 460A. Keyword list 400B also may include a multi-token keyword 460B.

A tokenizer 414 may generate single token hashmaps 418 for single token keywords 412. Tokenizer 414 also may generate multi-token head hashmaps 450 for multi-token keywords 460. For example, tokenizer 414 may generate a first multi-token head hashmap 450A for multi-token keywords 460A in keyword list 400A and generate a second multi-token head hashmap 450B for the multi-token keywords 460B in keyword list 400B.

The first tokens for each multi-token keyword 460 are added to associated multi-token head hashmaps 450. For example, the first "free" token from multi-token keyword 4604 and all of the other first tokens for any other multi-token keywords in keyword list 400A are added to head hashmap 450A. Similarly, the first "runner" token from multi-token keyword 460B and all of the other first tokens for any other multi-token keywords in keyword list 400B are added to head hashmap 450B.

Tokenizer 414 may generate multi-token segment chains 452 for each multi-token keyword 460. For example, tokenizer 414 may automatically generate multi-token chain 452A from multi-token keyword 460A that includes "free" token 454A, "-" dash delimiter 454B, and "runner" token 454C. Similarly, tokenizer 414 may automatically generate multi-token chain 452B from multi-token keyword 460B that includes "runner" token 456A, "-" dash delimiter 456B, and "up" token 456C. Multi-token chain 452A is linked to multi-token head hashmap 450A and multi-token chain 452B is linked to multi-token head hashmap 450B.

Keyword matcher 415 applies tokens 416 extracted by tokenizer 414 from content 142 to single token hashmaps 418 and multi-token head hashmaps 450. For example, keyword matcher 415 may determine the first four words "will you see the" in content 142 do not generate matches in either single token hashmaps 418 or multi-token head hashmaps 450.

The next "free" token 416A from content 142 may generate a match in head hashmap 450A. Based on the match, keyword matcher 415 may compare "free" token 416A and following segments in content 142 with any multi-token chain 452A linked to hashmap 450A. For example, keyword matcher 415 may determine "free" token 416A matches linked segment 454A and identify segment chain 452A as an ongoing current chain.

Based on the match, keyword matcher 415 compares a next character 416B from content 142 both with any applicable hashmaps and with the next segment 454B in chain 452A. In this example, character 416B in content 142 is a space " " and the next item 454B in chain 452A is a "-" dash. Since there is no match, keyword matcher 415 determines no match and discards ongoing segment chain 452A.

Keyword matcher 415 compares a next "free" token 416C in content 142 with single token hashmaps 418 and multi-token head hashmaps 450. As with token 416A, "free" token 416C also generates a match in head hashmap 450A and keyword matcher 415 also identifies a match between "free" token 416C and segment 454A in chain 452A. Accordingly, keyword matcher 415 identifies segment chain 452A as a currently ongoing chain.

Based on the match, keyword matcher 415 compares a next "-" dash delimiter 416D in content 142 with any applicable hashmaps and the next "-" dash 454B in chain 452A. Keyword matcher 415 then determines a next "runner" token 416E in content 142 matches a final segment 454C in chain 452A.

Keyword matcher 415 identifies a multi-token keyword match in keyword list 400A since the string 416C-416E of content 142 matches multi-token chain 452A. Based on the match, rule controller 134 may trigger moderation rules associated with keyword list 400A.

In this example, "runner" token 416E also generates a match in head hashmap 450B. In other words, "runner" token 416E in content 142 also matches a first token of a multi-token keyword in keyword list 400B. Based on the match, keyword matcher 415 identifies multi-token chain 452B linked to head hashmap 450B. In this example, multi-token chain 452B includes a first segment 456A matching "inner" token 416E.

Based on the match, keyword matcher 415 compares a next item from content 142 with any applicable hashmaps and a next item in now currently ongoing multi-token chain 452B. In this example, the next "-" delimiter 416F matches next segment 456B in multi-token chain 452B and a next "up" token 416G in content 142 matches a final "up" segment 456C in chain 452B.

Keyword matcher 415 identifies a multi-token keyword match in keyword list 400B since string 416E-416G in content 142 matches chain 452B. Based on the match, rule controller 134 applies moderation rules associated with keyword list 400B to content 142.

Figure 11:
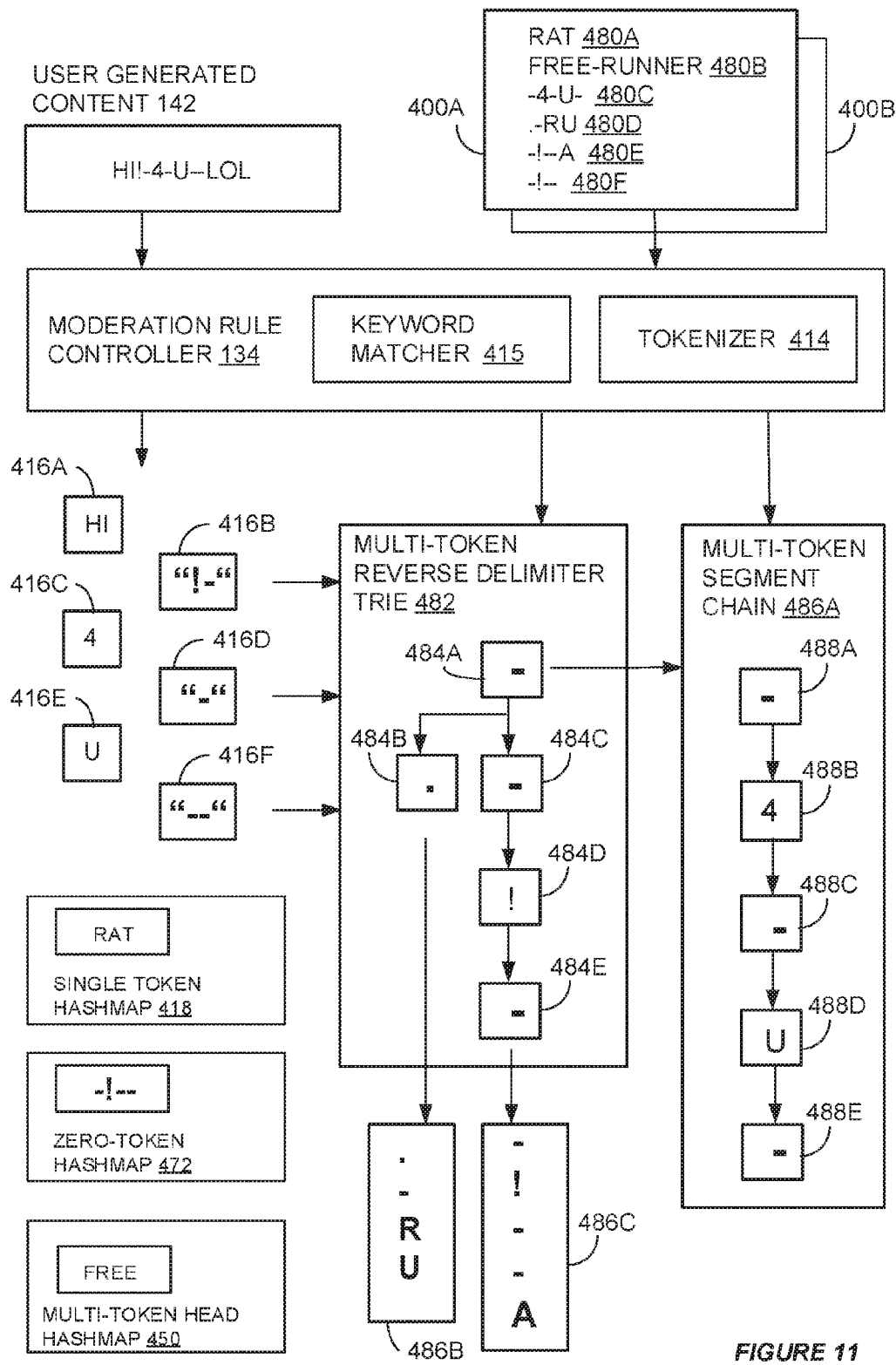
FIG. 11 shows another example of the multi-token matching scheme.

FIG. 11 shows another example of the multi-token matching scheme. In this example, keyword list 400A may include single token keyword 480A, multi-token keyword keywords 480B-480E, and zero-token keyword 480F. Multi-token keyword 480B may include a leading token and multi-token keywords 480C-480E may include leading delimiters.

Tokenizer 414 may generate one or more single token hashmaps 418 for any single token keywords in keyword lists 400, generate zero-token hashmaps 472 for single delimiter keywords in keyword lists 400, and generate multi-token head hashmaps 450 similar to those described above in FIG. 10 for any token leading multi-token keywords in keyword lists 400.

For example, single token hashmap 418 may include keyword 480A, zero-token hashmap 472 may include single delimiter keyword 480F, and multi-token head hashmap 450 may include the leading token for multi-token keyword 480B. Tokenizer 414 also generates and links multi-token segment chains similar to those described above in FIG. 10 to multi-token head hashmap 450.

Tokenizer 414 also automatically generates a multi-token reverse delimiter trie 482 for leading delimiter multi-token keywords 480C-480E. Reverse trie 482 may list the leading delimiters in reverse order to identify a set of delimiters immediately preceding a following head token. For example, the single leading "-" dash delimiter for keyword 480C is included as the first node 484A in reverse trie 482. The leading ".-" delimiter for keyword 480D is represented in delimiter trie 482 in reverse order by nodes 484A and 484B, respectively. The leading "-!--" delimiter for keyword 480E is represented in reverse order in delimiter trie 482 by nodes 484A, 484C, 484D, and 484E, respectively.

Tokenizer 414 also generates multi-token segment chains 486 for multi-token leading delimiter keywords 480C-489E. For example, segment chain 486A includes the string of segments for keyword 480C, segment chain 486B includes the string of segments for keyword 480D, and segment chain 486C includes the string of segments for keyword 480E.

Tokenizer 414 links nodes 484 in reverse trie 482 with chains 486. For example, multi-token chain 486A is linked to node 484A, multi-token chain 486B is linked to node 484B, and multi-token chain 486C is linked to node 484E.

Keyword matcher 415 compares tokens in user generated content (UGC) 142 with single token hashmaps 418, zero-token hashmaps 472. multi-token head hashmaps 450, and reverse head delimiter trie 482. A first "HI" token 416A from content 142 does not generate a match in any hashmap or reverse trie 482.

A last "-" in the next "!-" delimiter 416B generates a match with node 484A in reverse trie 482. Accordingly, keyword matcher 415 starts a matching operation for an ongoing chain 486A linked to node 484A. The next "!" in delimiter 416B has no sub-node match in reverse trie 482 so no additional chains 486 are started.

Keyword matcher 415 compares a next "4" token 416C in content 142 with hashmaps 418, 472, and 450 and also with active ongoing segment chain 486A. The "4" token 416C produces no matches in hashmaps 418, 472, or 450 but does match segment 488B in chain 486A.

Next "-" delimiter 416D from content 142 matches character 488C in chain 486A and node 484A in reverse trie 482. Accordingly, keyword matcher 415 moves to the next character 488D in first chain 486A and starts a second chain 486A for delimiter 416D. The next "U" token 416E from content 142 produces no matches in hashmaps 418, 472, or 450 and does not match the next character 488B in the second newly started segment chain 486A. Accordingly, the second chain 488B is discarded. However, content token 416E matches the next segment 488D in the first ongoing chain 486A. Accordingly, keyword matcher 415 moves to the next character 488E in the first segment chain 486A.

The next "-" delimiter 416F in content 142 produces no matches in zero-token hashmap 472. The first forward "-" dash in "- -" delimiter 416F matches segment 488E completing chain 486A. Accordingly, keyword matcher 415 identifies content string "-4-U-" as a match in keyword list 400A. The tailing "-" dash in delimiter 416F matches node 484A in reverse trie 482. Accordingly, keyword matcher 415 starts another new ongoing chain 486A. The second forward "-" dash in delimiter 416F also matches node 484C in reverse trie 482. However, no chains 486 are linked to node 484C so no additional chains are started. Keyword matcher 415 processes each subsequent token and delimiter in content 142 in a similar manner.

Figure 12:
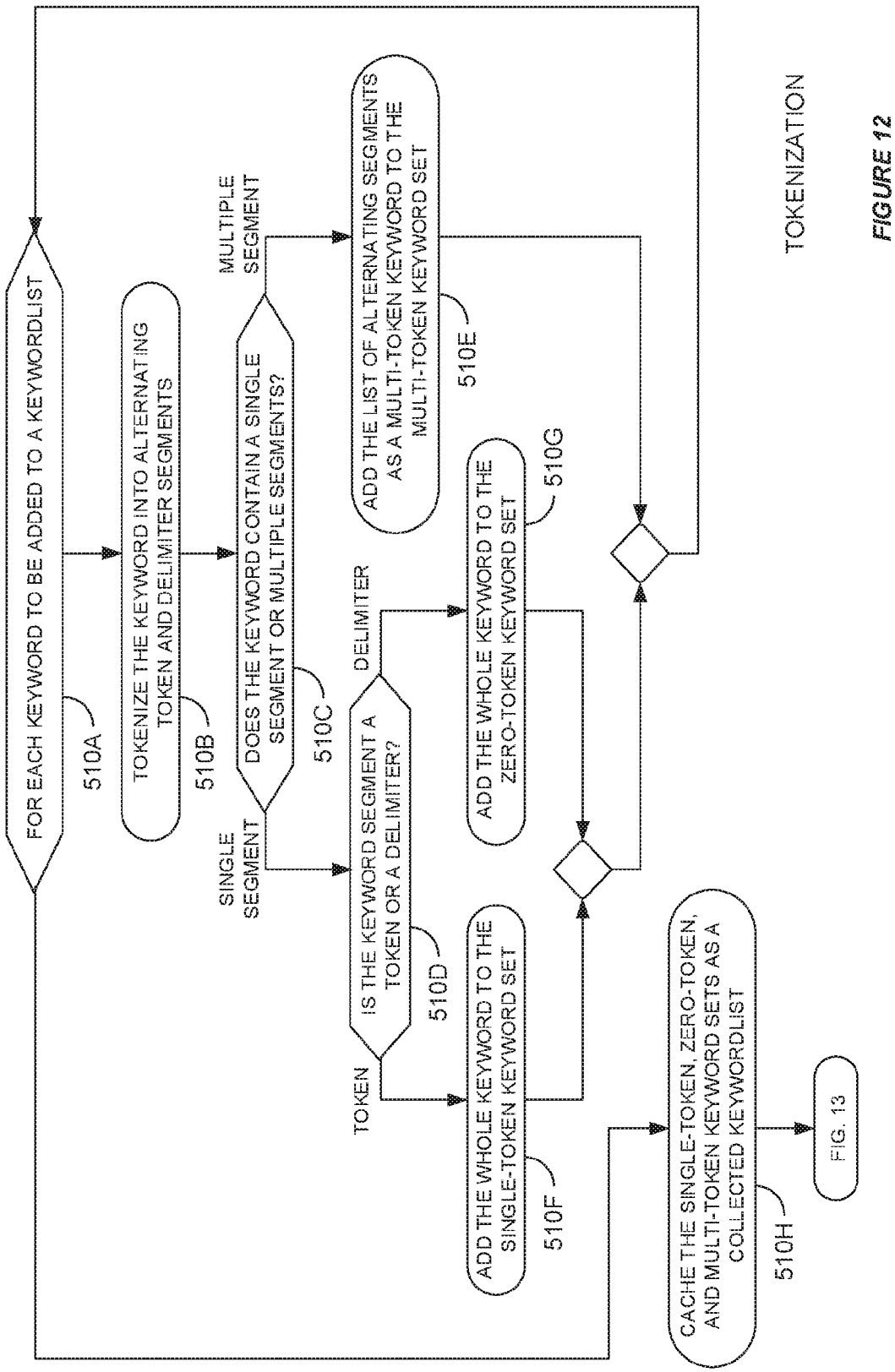
FIGS. 12 and 13 show examples of how hashmaps, reverse tries, and segment chains are generated by the multi-token matching scheme.
Figure 13:
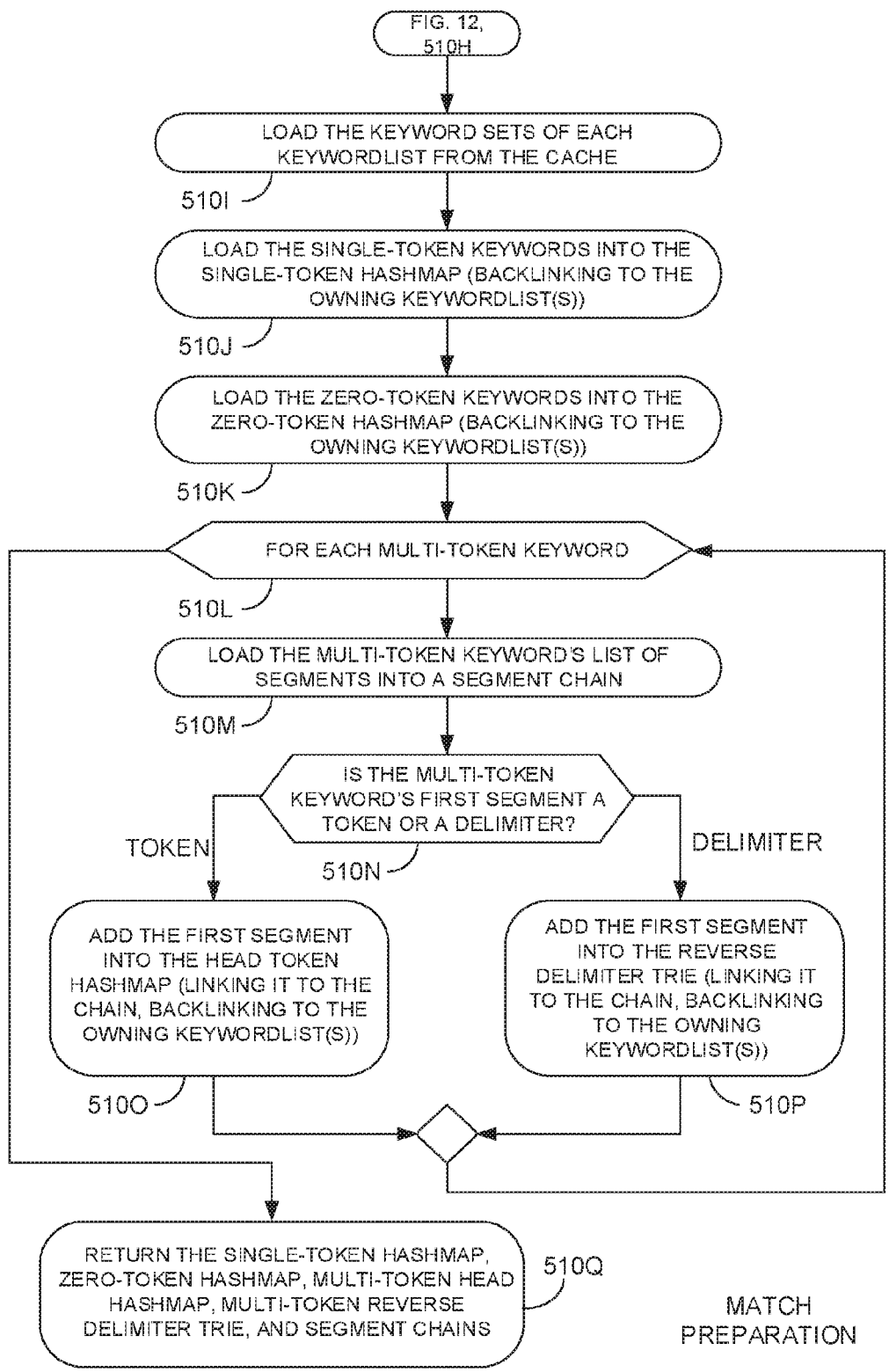

FIGS. 12 and 13 show in more detail the process for tokenizing keywords in a keyword list and generating single token hashmaps, multi-token hashmaps, zero token hashmaps, reverse tries, and segment chains for the multi-token hashmaps and reverse tries. Operation 510A identifies each keyword to be added to a keyword list. Operation 510B tokenizes the keyword into alternating token and delimiter segments. Operation 510C determines if the keyword contains a single segment or multiple segments. For example, the keyword may include a single token, single delimiter, or a combination of one or more tokens and delimiters.

Operation 510D determines if a single segment keyword is a token or a delimiter. For a single token keyword, operation 510F adds the whole keyword to a single-token keyword set. For a single delimiter keyword, operation 510G adds the whole delimiter to a zero-token keyword set. Operation 510D adds any multi-segment keywords including both tokens and delimiters to a multi-token keyword set.

The above process is repeated for each keyword in a particular keyword list. Operation 510H caches the single-token keyword set, zero-token keyword set, and multi-token keyword set as a collected keyword list.

Referring to FIG. 13, operation 510I loads the keyword sets for each keyword list from the cache into local server memory. Operation 510J loads the single-token keywords into a single-token hashmap and backlinks the single-token hashmap to the associated keyword list. Operation 510K loads the zero-token keywords into a zero-token hashmap and backlinks the zero-token hashmap to the associated keyword list.

Operation 510L processes each multi-token keyword from the multi-token keyword set. Operation 510M first loads the multi-token keyword's list of segments into a segment chain, such as chains 452 shown in FIG. 10 and chains 486 shown in FIG. 11.

Operation 510N determines if the first segment of the multi-token keyword is a token or a delimiter. If the first segment is a token, operation 510O adds the first segment into a head token hashmap. Operation 510O also links the head token hashmap to the segment chain for the multi-token keyword and the owning keyword list. If the first segment of the multi-token keyword is a delimiter, operation 510P adds the first delimiter segment into a reverse delimiter trie. Operation 510P also links the reverse delimiter tree to the segment chain for that multi-token keyword and the owning keyword list.

Operation 510O returns the single-token hashmap, zero-token hashmap, multi-token head hashmap, multi-token reverse delimiter trie, and multi-token segment chains linked to the multi-token head hashmap and multi-token reverse delimiter trie.

Figure 14A:
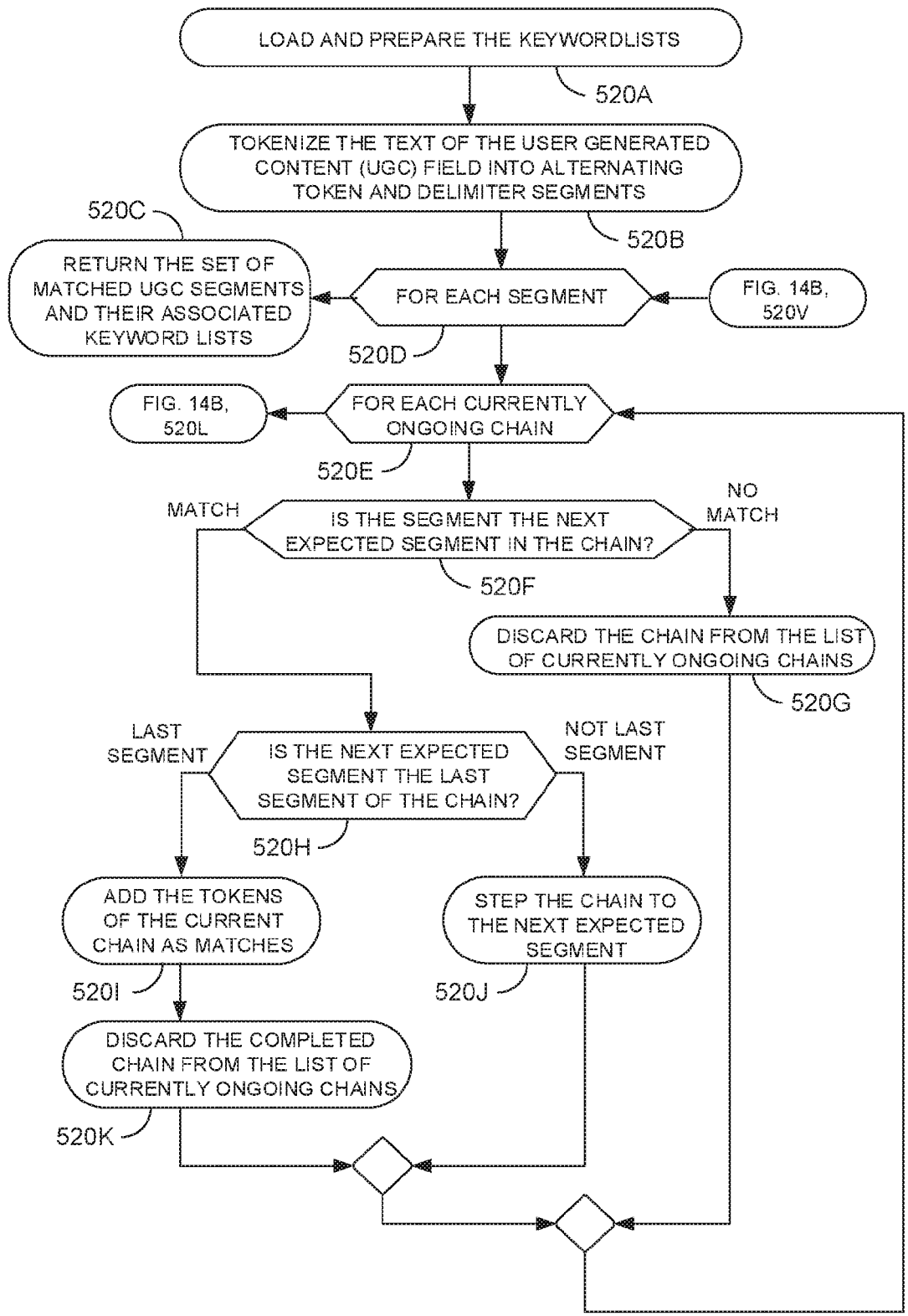
FIGS. 14A and 14B show how the multi-token matching scheme identifies keyword matches in user generated content.
Figure 14B:
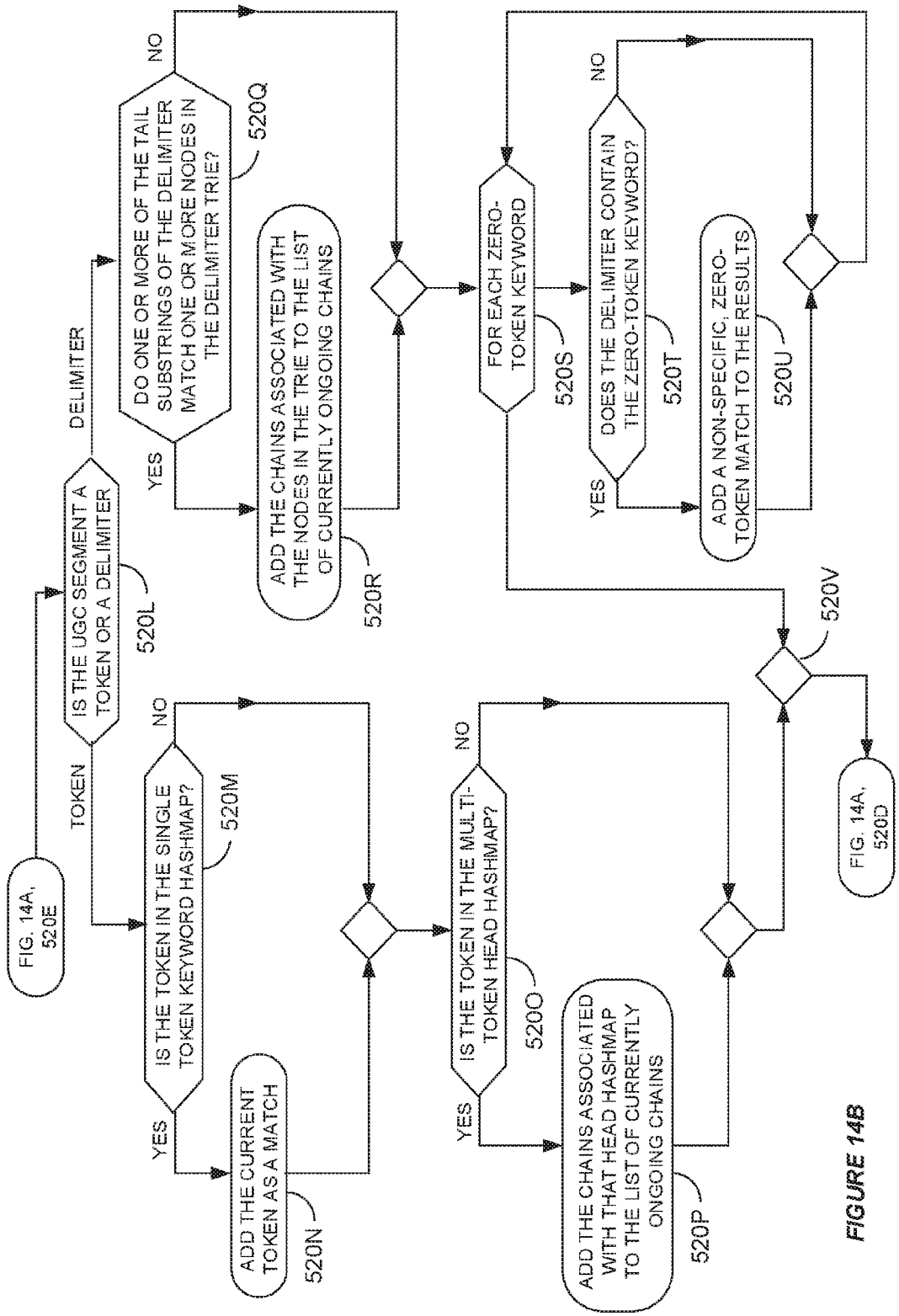

FIGS. 14A and 14B show an example process for identifying user generated content (UGC) that matches keywords in the keyword lists. Operation 520A loads and prepares the keyword lists as described above in FIGS. 12 and 13. Operation 520B tokenizes text in the UGC into alternating token and delimiter segments. Operation 520D processes each segment of the UGC content and operation 520E processes each currently ongoing chain as identified below in FIG. 14B. Based on comparisons described below operation 520C returns a set of matched UGC segments and their associated matching keyword lists.

For each currently ongoing segment chain, operation 520F determines if the UGC segment matches the next expected segment in any ongoing segment chains. If not the segment chain is discarded from the list of currently ongoing segment chains in operation 520G. If there is a match, operation 520H determines if the expected segment is the last segment in the keyword chain. If not the last segment, operation 520J steps to the next expected segment in the keyword chain. If the last segment in the chain, operation 520C adds the set of content matching the keyword chain as matches and operation 520K discards the completed keyword chain from the list of currently ongoing chains. Operation 520E then continues with any remaining ongoing keyword chains.

Referring to FIG. 14B, operation 520L determines if the UGC segment is a token or a delimiter. If a token, operation 520M determines if the token is in any single token keyword hashmaps. If so, operation 520N identifies the current UGC token as a keyword match in the results.

Operation 520O determines if the UGC token matches any entries in the multi-token head hashmaps. If so, operation 520P adds the keyword chains linked to the head hashmap to the list of currently ongoing chains. Operation 520V then returns to operation 520D in FIG. 14A.

Referring back to operation 520L, if the UGC segment is a delimiter, operation 520Q checks if one or more tail substrings in the delimiter match one or more nodes in the reverse delimiter trie. If so, operation 520R adds the keyword segment chains linked to the matching reverse delimiter tree nodes to the list of current ongoing chains.

Operation 520S compares the UGC delimiter with each zero token keyword. If the UGC delimiter contains any zero-token keywords in operation 520T, operation 520U identifies a zero-token match in the results. Operation 520V then returns to operation 520D in FIG. 12A.

Figure 15:
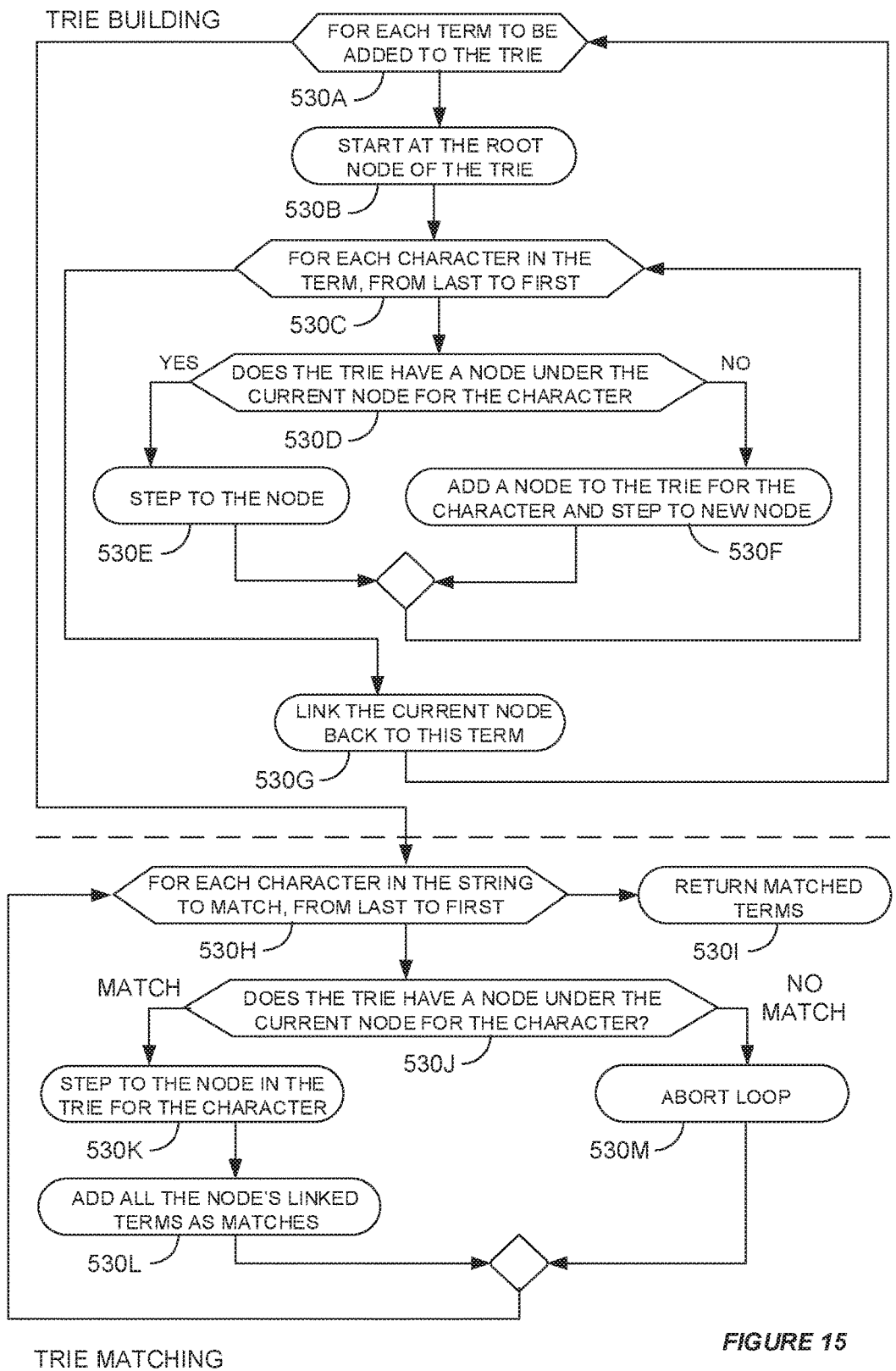
FIG. 15 shows one example of how a reverse trie is built and compared with user generated content.

FIG. 15 shows an example reverse delimiter trie building and matching process. Operation 530A starts the reverse Vie building process for the leading delimiter term in the multi-token keyword. Operation 530B starts at the root node of the reverse trie and operation 530C starts in a reverse order from the last character in the delimiter to the first character in the delimiter term.

Operation 530D determines if the reverse trie has a node under the current node for the delimiter term character. Operation 530E steps to the next sub-node for a matching character. Operation 530E adds a new sub-node when the reverse trie does not have an existing node for the character and then steps to the new node. The trie building process then jumps back to operation 530C to process the next character in the delimiter term. Operation 530G links the current reverse trie node back to the associated delimiter term.

Operation 530H performs content matching after the reverse trie is built in operation 530A. Operation 530H processes each character in a UGC delimiter string starting from the last delimiter character to the first delimiter character. Operation 530J starts from the root of the reverse delimiter trie and determines if the UGC character currently being processed matches a node under the current node. If not, operation 530M aborts the trie matching operation for the content delimiter. If there is a match, operation 530K steps to the reverse trie node for the matching character and operation 530L adds any delimiter terms linked to the node as a match. Operation 530I then returns all of the matched delimiter terms. As described above, the segment chains linked to the matching nodes are then started as current ongoing chains.

Figure 16:
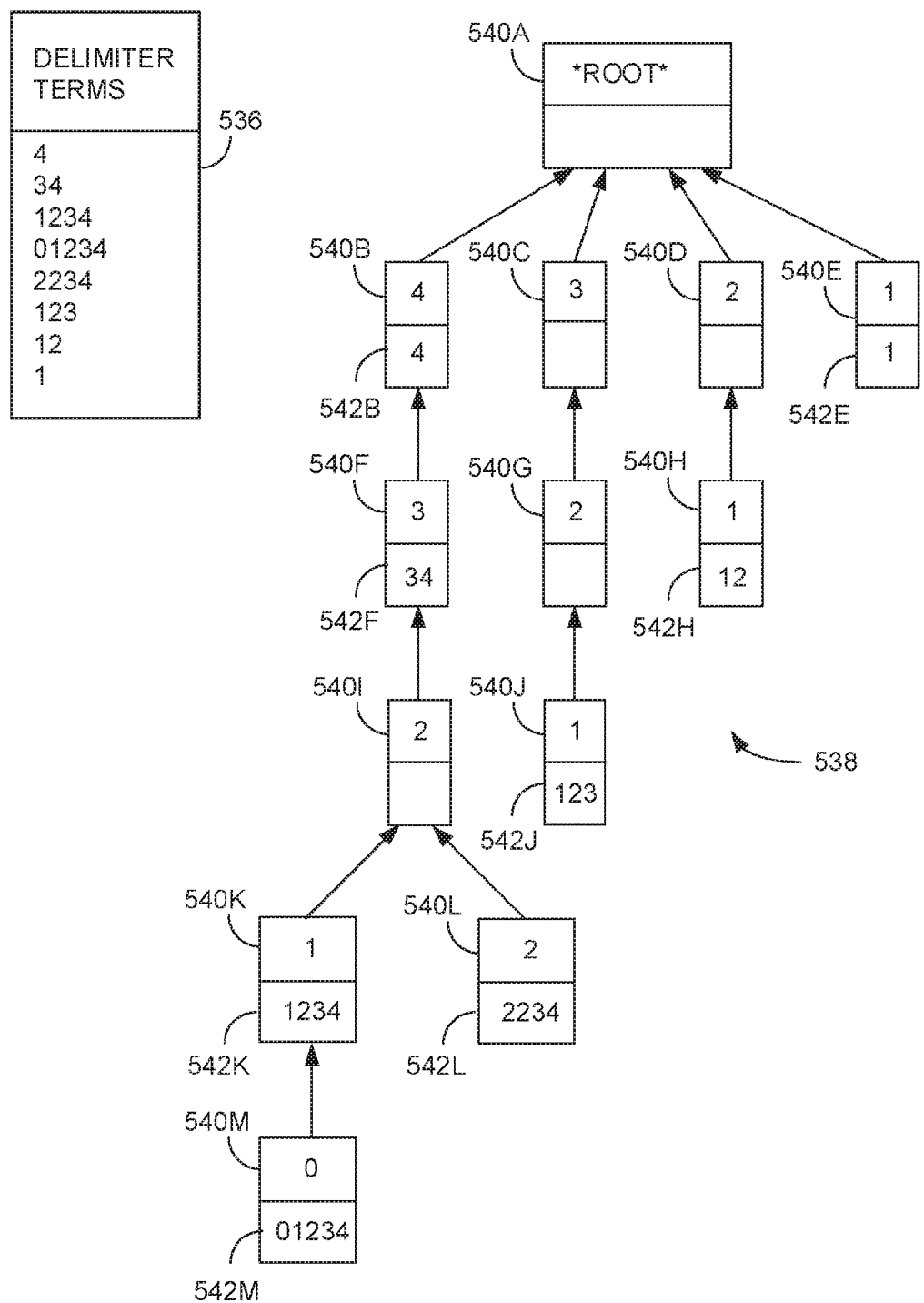
FIG. 16 shows another example of how a reverse trie is built.

FIG. 16 shows an example of the reverse trie building process of FIG. 15 in more detail. A set of delimiter terms 536 generate a reverse delimiter trie 538. The trie building process starts at a root node 540A in reverse trie 538 and creates a new sub-node 540B for first delimiter term "4". A link 5429 associates node 540B with delimiter term "4".

A second delimiter term "34" starts at root 540A and a last "4" character matches node 540B. A sub-node 540F is created for the starting "3" character in delimiter term "34" and delimiter term "34" and any associated segment chains are linked to sub-node 542F. Any UGC delimiter ending in 34 would link to delimiter terms "4" and "34".

A third delimiter term "1234" starts at root 540A. A last "4" character matches node 540B and a second trailing "3" character matches node 540F. A sub-node 540I is created for a third trailing "2" character and a sub-node 540K is created for the fourth trailing "1" character. Delimiter term "1234" and any associated segment chains are then associated with node 540K by link 542K. A similar process is performed with link 542M linking delimiter term "01234" to node 540M.

A next delimiter term "2234" starts again at root node 540A. A first trailing "4" character matches node 540B, a second trailing "3" character matches node 540F, and a third trailing "2" character matches node 540I. A new node 540L is created for the fourth trailing "2" character. A link 542L associates delimiter term "2234" and any associated chains with node 540L. Similar processes create link 542J associating node 540J with delimiter term "123" and any associated chains, create link 542H associating node 540H with delimiter term "12" and any associated chains, and create link 542E associating node 540E with delimiter term "1" and any associated chains.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A database system, comprising:
 a processor; and
 a memory coupled to the processor and storing instructions that, when executed by the processor, cause the database system to:
  receive an electronic communication from a computing device of a user, the electronic communication comprising a request to post content to the database system;
  receive a keyword list including multi-token keywords, wherein tokens in the multi-token keywords include groups of one or more alphanumeric characters separated by one or more non-alphanumeric delimiters;
  store the keyword list in a cache memory coupled to the database system;
  generate, based on the keyword list:
   a head hashmap including leading tokens for the multi-token keywords, wherein generating the head hashmap includes loading the keyword list from the cache memory into a local server memory coupled to the database system; and
   multi-token chains linked to the head hashmap and identifying the tokens and delimiters in the multi-token keywords;
  apply tokens from the content to the head hashmap;
  identify the tokens from the content generating matches in the head hashmap as matching tokens;
  compare the matching tokens and following segments in the content with the multi-token chains; and
  identify the content as matching at least one of the keywords in the keyword list when the matching tokens and the following segments in the content match one of the multi-token chains.

2. The database system of claim 1, wherein the memory further stores instructions for causing the database system to:
 apply the tokens from the content to a single token hashmap that includes single token keywords from the keyword list; and
 identify the content as matching at least one of the keywords in the keyword list when the tokens from the content generate matches in the single token hashmap.

3. The database system of claim 1, wherein the memory further stores instructions for causing the database system to:
 receive an additional keyword list including multi-token keywords;
 generate an additional head hashmap including leading tokens for the multi-token keywords in the additional keyword list;
 generate an additional set of multi-token chains linked to the additional head hashmap identifying tokens and delimiters for the multi-token keywords in the additional keyword list;
 apply tokens from the content to the additional head hashmap;
 identify the tokens from the content generating matches in the additional head hashmap as matching tokens;
 compare the additional matching tokens and following segments in the content with the additional set of multi-token chains; and
 identify the content as matching at least one of the keywords from the additional keyword list when the matching additional tokens and the following segments in the content match one of the additional set of multi-token chains.

4. The database system of claim 1, wherein the memory further stores instructions for causing the database system to:
 identify a delimiter segment in the content;
 compare the delimiter segment with a delimiter trie, the delimiter trie to identify leading delimiters in the multi-token keywords and linked to at least some of the multi-token chains;
 identify nodes in the delimiter trie matching tail portions of the delimiter segment;
 identify the multi-token chains linked to the matching nodes of the delimiter trie; and
 identify the content as matching at least one of the keywords from the keyword list when the matching tail portions of the delimiter segment and following portions of the content match the identified multi-token chains.

5. The database system of claim 4, wherein the delimiter trie identifies the leading delimiters in the multi-token keywords in a reverse order.

6. The database system of claim 1, including a zero hashmap for keywords in the keyword list including only delimiters.

7. The database system of claim 1, wherein the memory further stores instructions for causing the database system to:
 utilize a rule template to:
  create or edit moderation rules;
  display and receive selections of different keyword lists to link to the moderation rules; and
  display an action field to receive selections of moderation actions to apply to the content based on the content matching at least one of the keywords in the keyword list.

8. The database system of claim 7, wherein the memory further stores instructions for causing the database system to:
 receive the content from a user system;
 compare the keywords in the keyword lists with the content; and
 apply the selected moderation actions for the moderation rules based on the content matching at least one of the keywords in the keyword lists.

9. A database system comprising:
 a processor; and
 a memory storing instructions that, when executed by the processor, cause the system to perform operations comprising:

receiving an electronic communication from a computing device of a user, the electronic communication comprising a request to post content to the database system;
storing, in a cache memory coupled to the database system, a keyword list including multi-token keywords, wherein tokens in the multi-token keywords include groups of one or more alphanumeric characters separated by one or more delimiters;
loading the keyword list from the cache memory to a local server memory coupled to the database system;
adding leading tokens from the multi-token keywords to a head hashmap;
generating segment chains identifying the tokens and the delimiters in the multi-token keywords;
linking the segment chains to the head hashmap;
identifying tokens in the content generating matches in the head hashmap as matching tokens;
comparing the matching tokens and following segments of the content with the segment chains; and
identifying portions of the content matching the segment chains as keyword list matches.

10. The system of claim 9, wherein the instructions further cause the database system to perform operations comprising:
generating delimiter tries identifying leading delimiters in the multi-token keywords;
linking the delimiter tries to some of the segment chains;
identifying delimiters in the content matching portions of the delimiter tries;
comparing the segment chains linked to the matching portions of the delimiter tries with the matching delimiters and following portions of the content; and
identifying the portions of the content matching the segment chains as the keyword list matches.

11. The system of claim 10, wherein the delimiter tries identify the leading delimiters of the multi-token keywords in a reverse order.

12. The system of claim 9, wherein the instructions further cause the database system to perform operations comprising:
adding single token keywords in the keyword list to a single token hashmap; and
identifying the tokens from the content generating matches in the single token hashmap as single token keyword matches in the keyword list.

13. The system of claim 9, wherein the instructions further cause the database system to perform operations comprising:
adding delimiter only keywords in the keyword list to a zero token hashmap;
comparing delimiter strings in the content with the zero token hashmap; and
identifying the delimiter strings generating matches in the zero token hashmap as keyword list matches.

14. The system of claim 9, wherein the instructions further cause the database system to perform operations comprising:
adding single token keywords from the keyword list to a single token hashmap;
adding delimiter only keywords from the keyword list to a zero token hashmap; and
adding multi-token keywords including tokens and delimiters to a multi-token keyword set.

15. The system of claim 14, wherein the instructions further cause the database system to perform operations comprising:
adding leading tokens in any of the multi-token keywords from the multi-token keyword set to the head hashmap; and
adding leading delimiters in any of the multi-token keywords from the multi-token keyword set to a reverse delimiter trie.

16. The system of claim 15, wherein the instructions further cause the database system to perform operations comprising:
assigning a first set of the segment chains for the multi-token keywords with leading tokens to the head hashmap; and
assigning a second set of the segment chains for the multi-token keywords with leading delimiters to the reverse delimiter trie.

17. A method comprising:
receiving, content by a database system, an electronic communication from a computing device of a user, the electronic communication comprising a request to post content to the database system;
receiving, by the database system, a keyword list including multi-token keywords, wherein tokens in the multi-token keywords include groups of one or more alphanumeric characters separated by one or more non-alphanumeric delimiters;
storing the keyword list in a cache memory coupled to the database system;
generating, by the database system based on the keyword list:
a head hashmap including leading tokens for the multi-token keywords, wherein generating the head hashmap includes loading the keyword list from the cache memory into a local server memory coupled to the database system; and
multi-token chains linked to the head hashmap and identifying the tokens and delimiters in the multi-token keywords;
applying, by the database system, tokens from the content to the head hashmap;
identifying, by the database system, tokens from the content generating matches in the head hashmap as matching tokens;
comparing, by the database system, the matching tokens and following segments in the content with the multi-token chains; and
identifying, by the database system, the content as matching at least one of the keywords in the keyword list when the matching tokens and the following segments in the content match one of the multi-token chains.

18. The method of claim 17, further comprising
applying the tokens from the content to a single token hashmap that includes single token keywords from the keyword list; and
identifying the content as matching at least one of the keywords in the keyword list when the tokens from the content generate matches in the single token hashmap.

19. The method of claim 17, further comprising:
receiving an additional keyword list including multi-token keywords;
generating an additional head hashmap including leading tokens for the multi-token keywords in the additional keyword list;
generating an additional set of multi-token chains linked to the additional head hashmap identifying tokens and delimiters for the multi-token keywords in the additional keyword list;
applying tokens from the content to the additional head hashmap;

identifying the tokens from the content generating matches in the additional head hashmap as matching tokens;

comparing the additional matching tokens and following segments in the content with the additional set of multi-token chains; and identifying the content as matching at least one of the keywords from the additional keyword list when the matching additional tokens and the following segments in the content match one of the additional set of multi-token chains.

20. The method of claim 17, further comprising:

identifying a delimiter segment in the content;

comparing the delimiter segment in the content with a delimiter trie identifying leading delimiters in the multi-token keywords and linked to at least some of the multi-token chains;

identifying nodes in the delimiter trie matching tail portions of the delimiter segment;

identifying the multi-token chains linked to the matching nodes of the delimiter trie; and identifying the content as matching at least one of the keywords from the keyword list when the matching tail portions of the delimiter segment and following portions of the content match the identified multi-token chains.

* * * * *